(12) United States Patent
Azaceta Muñoz et al.

(10) Patent No.: US 11,306,219 B2
(45) Date of Patent: Apr. 19, 2022

(54) COATINGS HAVING REPELLENT FUNCTION AND USE THEREOF

(71) Applicant: FUNDACIÓN CIDETEC, Donostia-San Sebastián (ES)

(72) Inventors: Eneko Azaceta Muñoz, Donostia-San Sebastian (ES); Jesús Palenzuela Conde, Donostia-San Sebastián (ES); Ramón Tena Zaera, Donostia-San Sebastián (ES); Estibaliz Medina, Ajangiz (ES)

(73) Assignee: FUNDACIÓN CIDETEC, Donostia-San Sebastián (ES)

( * ) Notice: Subject to any disclaimer, the term of this patent is extended or adjusted under 35 U.S.C. 154(b) by 494 days.

(21) Appl. No.: 16/466,617

(22) PCT Filed: Dec. 21, 2017

(86) PCT No.: PCT/ES2017/070838
§ 371 (c)(1),
(2) Date: Jun. 4, 2019

(87) PCT Pub. No.: WO2018/122428
PCT Pub. Date: Jul. 5, 2018

(65) Prior Publication Data
US 2019/0322892 A1    Oct. 24, 2019

(30) Foreign Application Priority Data
Dec. 29, 2016  (EP) ..................................... 16382668

(51) Int. Cl.
*C09D 139/04* (2006.01)
*C09D 5/00* (2006.01)
(52) U.S. Cl.
CPC ............. *C09D 139/04* (2013.01); *C09D 5/00* (2013.01)
(58) Field of Classification Search
CPC ................................ C09D 139/04; C09D 5/00
USPC ........................................................ 524/105
See application file for complete search history.

(56) References Cited

U.S. PATENT DOCUMENTS

2006/0032074 A1  2/2006  Kitoku et al.
2016/0032074 A1* 2/2016  Aizenberg .............. A61L 29/16
                                                            514/772.4

FOREIGN PATENT DOCUMENTS

WO   WO 2011/031442 A2   3/2011
WO   WO 2014/012080 A1   1/2014
WO   WO 2014/209441 A2   12/2014

OTHER PUBLICATIONS

International Search Report and Written Opinion dated Apr. 11, 2018 for PCT Application No. PCT/ES2017/070838, 10 pages.
Azaceta, et al., "Synthesis and characterization of poly(1-vinyl-3-alkylimidazolium) iodide polymers for quasi-solid electrolytes in dye sensitized solar cells", Electrochemica Acta 2010, Jan. 29, 2009, vol. 56, pp. 42-46.
Azcune, et al., "Facile and scalable synthesis of nanoporous materials based on poly(ionic liquid)s", ChemSusChem 2014, Sep. 12, 2014, vol. 7, pp. 3407-3412.
Pitenis, et al., "Flubricity from entangled polymer networks on hydrogels", Journal of Tribology 2016, Jul. 26, 2016, vol. 138, Issue 4, 042102, 3 pages.
Simon, et al., "The crucial divide between Hydrophobic and Hydrophilic coatings", Med-Tech Innovation Apr. 4, 2011, http://www.med-techinnovation.com/articles/articles/article/13/The+Crucial+Divide+between++Hydrophobic+and+Hydrophilic-Coatings, Apr. 4, 2011.
Xu, et al., "Fluoroalkylated N-heterocyclic carbine complexes of palladium", Journal of Organometallic Chemistry 2000, vol. 598, pp. 409-416.

* cited by examiner

*Primary Examiner* — Kelechi C Egwim
(74) *Attorney, Agent, or Firm* — Squire Patton Boggs (US) LLP

(57) ABSTRACT

It is provided a coating composition comprising an ionic liquid, and a crosslinked polymeric ionic liquid, wherein the crosslinked polymeric ionic liquid and the ionic liquid are not linked through covalent bonds, and wherein the crosslinked polymeric ionic liquid is linked to a substrate surface. It is also provided a process for its preparation, as well as an article of manufacture at least in part coated with the coating composition as defined above.

20 Claims, 4 Drawing Sheets

COATINGS HAVING REPELLENT FUNCTION AND USE THEREOF

This application claims the benefit of European Patent Application EP16382668.8 filed on Dec. 29, 2016.

TECHNICAL FIELD

The present invention relates to the field of polymer chemistry, more particularly to coating materials. In particular, the invention relates to a ionogel-based omniphobic coating and to processes for its preparation. The invention also relates to the use of the new ionogel-based omniphobic coatings.

BACKGROUND ART

The treatment of surfaces mimicking liquid repellency of some natural surfaces on animals, insect, and plants has been of increasing interest in the field of material science. Of particular interest are omniphobic surfaces (i.e repellent to both polar and apolar liquids) due to its extremely broad potential applications in different fields such as self-cleaning, fluid transport, anti-fouling (including biofouling), cultural heritage protection (e.g. anti-graffiti).

Surfaces having good slippery properties such as the called Slippery Liquid-Infused Porous Surfaces (SLIPS) are known. In Slippery Liquid-Infused Porous Surfaces (SLIPS) a solid roughened surface is coated with a wetting liquid, a lubricant, having a high affinity to the surface. The lubricant forms an ultra-smooth surface over the roughened surface, by filling the hills, valleys, and/or pores of the roughened surface. As a consequence, various liquids, solids and gases have low adherence to the surface, thus reducing drag, fouling, adsorption and improving hydro- and aerodynamic properties of the material. However, this technology has some drawbacks such as the losses of the liquid lubricant due to the evaporation (among others) and consequent loss of slippery performance over time (i.e. durability issues).

In WO2014209441 a solidifiable composition for the preparation of slippery surfaces is disclosed. More specifically, SLIPS surfaces are obtained by forming a coating with a hardened polymer on a surface that makes of reservoir of a liquid lubricant. The lubricant and the hardened polymer together form a coating where the lubricant is stabilized on and within the hardened polymer. Particularly, it is described that such structures can be prepared to provide omniphobic surfaces, namely having both hydrophobic and oleophobic properties. However, although the obtained crosslinked network of the coatings can delay the loss of the encapsulated lubricant, the omniphobic properties can be maintained only a relatively short period of time, due to the loss of the lubricant, particularly at high temperatures (e.g. 100° C.) due to the evaporation of the lubricant.

While various ways of preparing slippery materials have heretofore been disclosed in the literature, there continues being a need of materials having omniphobic properties providing superior benefits, particularly having a higher durability.

SUMMARY OF INVENTION

Inventors have surprisingly found that a coating composition comprising an ionic liquid embedded in a crosslinked polymeric ionic liquid linked to a modified substrate surface, wherein the ionic liquid and the crosslinked polymeric ionic liquid are not linked through covalent bonds and are forming an ionogel, provides to the surface omniphobic properties that are superior to the ones obtained with known coatings for the same purpose. Particularly, the ionogel coating composition of the invention shows a good compatibility and favourable interactions between the components, providing a coating with improved mechanical properties, a higher resistance to the leakage of the non covalently bound components of the coating (wipe test), as well as a more long-lasting effect on the omniphobic property. The coating shows also better aesthetical properties. Therefore, the ionogel coating composition of the invention represents a promising improvement to what is found in the prior art concerning to the coating of surfaces to confer them omniphobic properties.

Thus, a first aspect of the invention is a coating composition comprising an ionic liquid, and a crosslinked polymeric ionic liquid, wherein the crosslinked polymeric ionic liquid and the ionic liquid are not linked through covalent bonds, and wherein the crosslinked polymeric ionic liquid is covalently linked to a substrate surface.

Advantageously, the coating composition of the invention allows provides the substrate with an improved omniphobicity, as is derived from the examples, without either loss or decay of the auto-cleaning properties of the freshly prepared coating (see FIG. 5).

Several documents in the literature teach that there is an inverse relationship between lubricity and degree of crosslinking, i.e. the more crosslinked a material is, the less likely it is to be slippery (e.g. cf. J. Simon, "The Crucial Divide between Hydrophobic and Hydrophilic Coatings", Med-Tech Innovation, http://content.yudu.com/A1rnef/medte-capr11/resources/18.htm). Other documents in the literature also provide statements dissuading the skilled person from crosslinking a polymeric structure, which would confer it rigidity, in order to get lower friction coefficients (cf. A. A. Pitenis et al. "Lubricity from Entangled Polymer Networks on Hydrogels", *J. Tribol.*, 2016, Vol. 138(4), 042102). Unexpectedly, beyond the SLIPS technology, the deposition of ionogel films (i.e. based on cross-linked polymeric ionic liquids and ionic liquids) on the surface of a substrate allows obtaining omniphobic coatings with solid-like properties, while keeping the slippery ability as good as the one of ionic liquids.

A second aspect of the invention is a process for the preparation of a coating composition as defined herein above and below over at least part of the surface of a substrate, the process comprising:
a) functionalizing at least part of the surface of the substrate;
b) mixing
   a ionic liquid crosslinker, particularly of formula $S_sQ_q$-X-$Q_qS_s$ as defined below,
   a solvent system which is a suitable organic solvent, a ionic liquid of formula $A_aB_b$ as defined below, or a mixture thereof, and
   optionally, an ionic liquid monomer, particularly of formula $O_xB_b$, as defined below,
c) at least partially coating the surface functionalised in step a) with the mixture prepared in step b);
d) carrying out a polymerization and crosslinking reaction of the coated surface of step c),
e) removing the solvent system used in step a); and
f) spreading over the coated surface of the substrate obtained in step c) an ionic liquid as a lubricant, particularly an ionic liquid of formula $A_aB_b$ as defined below.

A third aspect of the invention is an article of manufacture at least in part coated with the coating composition as defined herein above and below.

DETAILED DESCRIPTION OF THE INVENTION

Figure 1:
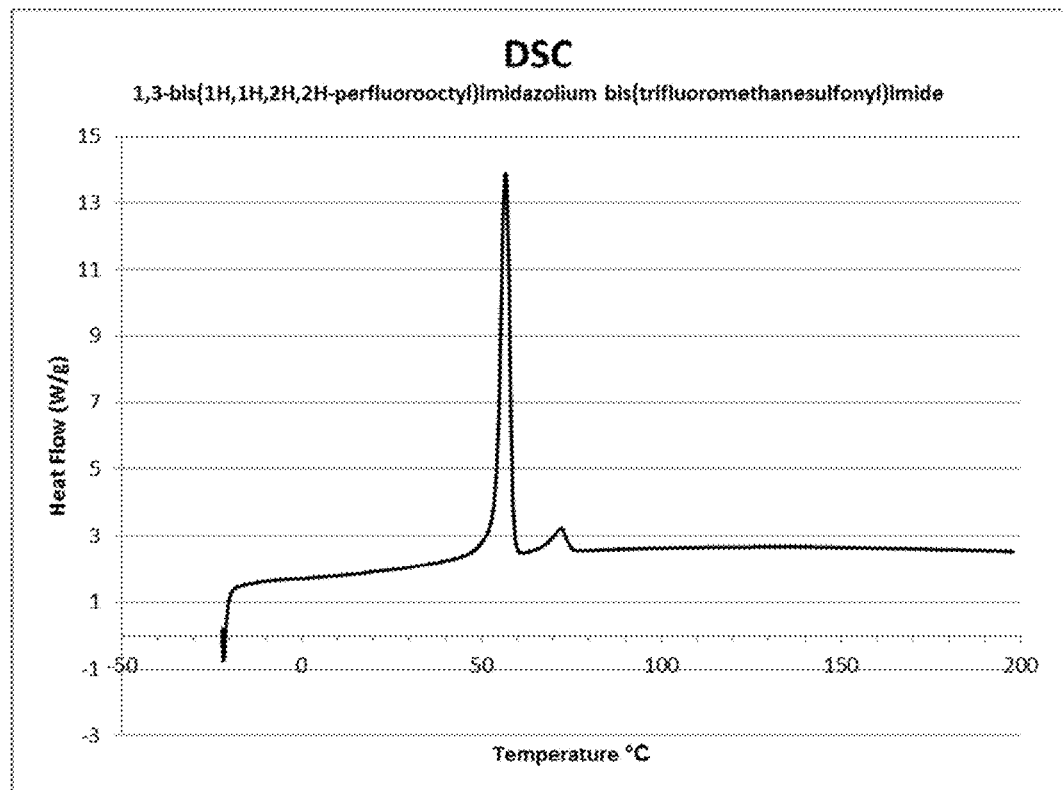
FIG. 1 shows the differential scanning calorimetry (DSC) of 1,3-bis(1H,1H,2H,2H-perfluorooctyl)imidazolium bis(trifluoromethanesulfonyl)imide.

For the sake of understanding, the following definitions are included and expected to be applied throughout description, claims and drawings.

As used herein, the indefinite articles "a" and "an" are synonymous with "at least one" or "one or more." Unless indicated otherwise, definite articles used herein, such as "the," also include the plural of the noun.

As used herein, the term "omniphobic" or variations of the word define as the ability of a material, particularly of a surface, to repel liquids regardless their chemical nature and polarity. Hence, omniphobic surfaces are hydrophobic and oleophobic surfaces simultaneously.

As used herein, the term "ionogel" means a continuous solid skeleton containing an ionic liquid.

As used herein, the term "alkyl" refers to a straight or branched C1-C30 hydrocarbon radical, in particular C1-C20, C1-C5 or C1-C4.

As used herein, the term "cyclyl" refers to a saturated or partially saturated C3-C8 cyclic radical. Examples of cyclil groups include, but are not limited to, cyclopropyl, cyclobutyl, cyclopentyl, cyclopentenyl, cyclohexyl, cyclohexenyl, cycloheptyl, and cyclooctyl.

As used herein, the term "heterocyclyl" refers to a radical derived from a monocyclic or polycyclic, saturated, unsaturated or aromatic hydrocarbon of 3 to 10 carbon atoms, wherein at least one of the carbon atoms of the cycle is substituted by N, O or S. Examples of heterocyclyl groups include, but are not limited to, furyl, imidazolyl, thienyl, thiazolyl, oxazolyl, pyridinyl, piperidinyl, piperazinyl, morpholyl, quinolyl, and benzofuryl. As used herein, the term "aryl" refers to a radical of one ring system with 1-3 rings, the rings being aromatic and being isolated or partially/totally fused and having 5-6 members, being each member independently selected from C, CH, N, NH, O, S where chemically possible, and the ring system being optionally substituted by one or more radicals independently selected from the group consisting of $(C_1-C_6)$alkyl, $(C_1-C_6)$alkoxy, nitro, cyano, and halogen.

According to the present invention when the ring system is formed by "isolated" rings means that the ring system is formed by two, three or four rings and said rings are bound via a bond from the atom of one ring to the atom of the other ring. The term "isolated" also embraces the embodiment in which the ring system has only one ring. Illustrative non-limitative examples of known ring systems consisting of one ring are those derived from: cyclopropyl, cyclobutyl, cyclopentyl, cyclhexyl, cycloheptyl, cyclopropenyl, cyclobutenyl, cyclopentenyl, phenyl, and cycloheptenyl.

According to the present invention when the ring system has rings "totally fused", means that the ring system is formed by two, three or four rings in which two or more atoms are common to two adjoining rings. Illustrative non-limitative examples are 1,2,3,4-tetrahydronaphthyl, 1-naphthyl, 2-naphthyl, anthryl, or phenanthryl.

According to the present invention when the ring system is "partially fused" it means that the ring system is formed by three or four rings, being at least two of said rings totally fused (i.e. two or more atoms being common to the two adjoining rings) and the remaining ring(s) being bound via a bond from the atom of one ring to the atom of one of the fused rings.

As used herein, the term "heteroaryl" represents a C- or N-radical of an aromatic 5- or 6-membered monocyclic ring, containing from one to four heteroatoms independently selected from O, S and N, that may be substituted according to the description at any available ring position.

As used herein, the term "ionic liquid (IL)" as used herein refers to a salt that is in the liquid state at relatively low temperatures (<100° C.). The ionic liquids species are constituted by voluminous ions, thus small charge densities, which lead to weak Coulombic interaction with their counterparts. Properties such as low melting temperature, negligible vapor pressure and high ionic conductivities derive from this unconventional nature.

As used herein, the term "monomer ionic liquid" refers to a "ionic liquid" as described above with at least one polymerizable functional group.

As used herein, the term "crosslinker" refers to an organic molecule having at least two polymerizable functional groups and which allows the formation of a three-dimensional network. Particularly, the term "ionic liquid crosslinker" refers to an ionic liquid having at least two polymerizable functional groups.

As used herein, the term "polymeric ionic liquid (PIL)" refers to an IL-based polymeric system obtained by polymerization of an IL monomer. It is worth noting that although ILs species are in a liquid state near room temperature, crosslinked-PILs are solid and combine the unique properties of ionic liquids species with the flexibility and properties of macromolecular architectures.

Polymeric ionic liquids can be obtained by direct polymerization of ionic liquid monomers by any polymerization technique known by those with ordinary skill in the art, such as free-radical, cationic, anionic, and condensation polymerization methods. To obtain the crosslinked-PIL, an ionic liquid crosslinker is added to the mixture of IL monomers. Alternatively, an ionic liquid crosslinker can be used instead of a mixture of IL monomer and ionic liquid crosslinker. Particularly, the polymerization technique is free-radical polymerization.

As mentioned above, one aspect of the present invention relates to a coating composition as defined above comprising a crosslinked polymeric ionic liquid, an ionic liquid, wherein the crosslinked polymeric ionic liquid and the ionic liquid are not linked through covalent bonds, and wherein the crosslinked polymeric ionic liquid is covalently linked to a substrate surface. Particularly, the crosslinked polymeric ionic liquid is linked to a vinyl group containing silane which is anchored to a substrate surface.

In a particular embodiment, in the coating composition of the invention the crosslinked polymeric ionic liquid and the ionic liquid are forming an ionogel.

In another particular embodiment, the ionic liquid is a compound of formula $A_aB_b$, wherein A is an organic cation comprising at least one omniphobic group:

B is an anion comprising at least one charged atom selected from the group consisting of $B^-$, $P^-$, $N^-$, $C^-$, $S^-$, $O^-$ y $M^-$ and combinations thereof, a is an integer from 1 to 100, particularly from 1 to 10, more particularly from 1 to 8; and b is the integer defining the stoichiometry necessary to neutralize the positive charge of A.

In a particular embodiment, B is an anion with a formula selected from the group consisting of:

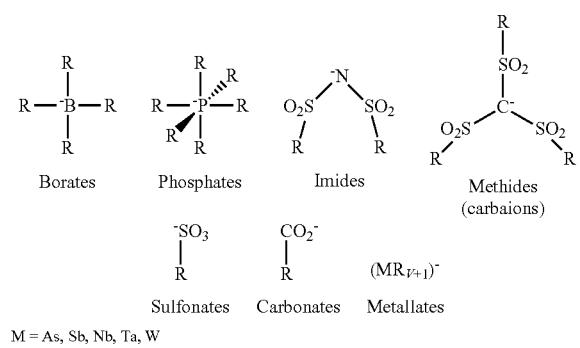

Borates    Phosphates    Imides    Methides (carbaions)

Sulfonates    Carbonates    Metallates

M = As, Sb, Nb, Ta, W
V = valence number of M metal wherein

R are the same or different and are selected from the group consisting of —H, —OH, —F, —Cl, —Br, —I, —CN, —$NO_2$, —$SO_3H$, $C_1$-$C_6$ hydroxy alkyl and a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, $Ph_2P(O)$—, $Ph_2P$—, $(CH_3)_2P(O)$—, $(CH_3)_2P$—, $Ph_2P(S)$—, $(CH_3)_2P(S)$—, $Ph_3P=N$—, $(CH_3)_3P=N$—, $FSO_2(CH_2)_n$—, $ClSO_2(CH_2)_n$—, $HSO_3(CH_2)_n$—, $HCO_2(CH_2)_n$—, $FSO_2NHSO_2(CH_2)_n$—, $CF_3SO_2NHSO_2(CH_2)_n$—, $C_nH_{2n+1}SO_2NHSO_2(CH_2)_n$—, $FSO_2(CH_2)_n$—, $ClSO_2(CH_2)_n$—, $C_nF_{2n+1}SO_2NH(CH_2)_n$—, $CH_3O$—$(Si(CH_3)_2O)_n$—, HO—$(Si(CH_3)_2O)_n$—, R—$(Si(CH_3)_2O)_n$—, wherein n is an integer having a value from 1 to 48; and wherein, optionally, two adjacent substituents R are linked to each other pairwise to form a polycyclic ring system.

In another particular embodiment, the R group is selected from the group consisting of —F and a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_8$-$C_{12}$ aryl, $C_1$-$C_{12}$ heteroaryl, alkylaryl, alkylheteroaryl, alkylcyclyl, and alkylheterocyclyl.

In a more particular embodiment, the R group is selected from the group consisting of —F and —$(CH_2)_n$—$(CF_2)_m$—$CF_3$, wherein n=0 to 8, and m=(n+1) to (n+12).

In a still more particular embodiment, B is an anion with a formula selected from the group consisting of:

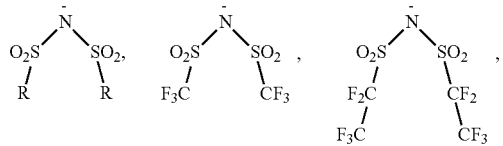

In another particular embodiment, A is an organic cation comprising at least one charged atom selected from the group consisting of $N^+$, $C^+$, $P^+$, $S^+$, and combinations thereof. More particularly, A is an organic cation with a formula selected from the group consisting of:

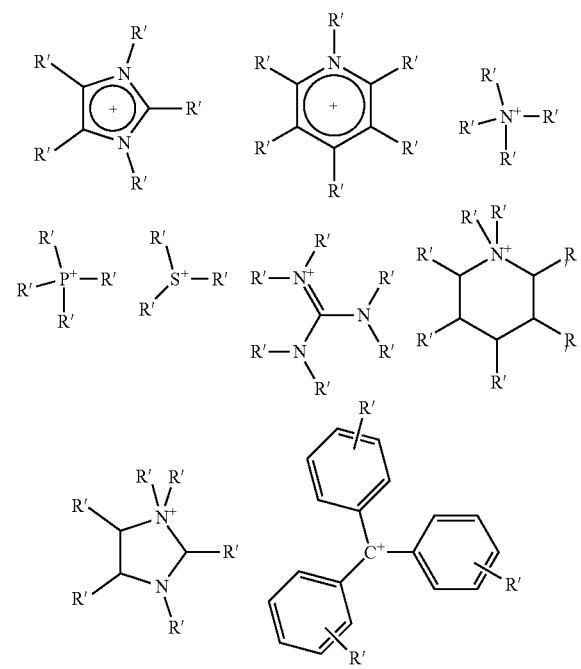

wherein
i) at least one R' is a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, Ph$_2$P(O)—, Ph$_2$P—, (CH$_3$)$_2$P(O)—, (CH$_3$)$_2$P—, Ph$_2$P(S)—, (CH$_3$)$_2$P(S)—, Ph$_3$P=N—, (CH$_3$)$_3$P=N—, FSO$_2$(CH$_2$)$_n$—, ClSO$_2$(CH$_2$)$_n$—, HSO$_3$(CH$_2$)$_n$—, HCO$_2$(CH$_2$)$_n$, FSO$_2$NHSO$_2$(CH$_2$)$_n$—, CF$_3$SO$_2$NHSO$_2$(CH$_2$)$_n$—, C$_n$H$_{2n+1}$SO$_2$NHSO$_2$(CH$_2$)$_n$—, FSO$_2$(CH$_2$)$_n$—, ClSO$_2$(CH$_2$)$_n$—, C$_n$F$_{2n+1}$SO$_2$NH(CH$_2$)$_n$—, CH$_3$O—(Si(CH$_3$)$_2$O)$_n$—, HO—(Si(CH$_3$)$_2$O)$_n$—, R—(Si(CH$_3$)$_2$O)$_n$—, wherein n is an integer having a value from 1 to 48; and wherein, optionally, two adjacent substituents R' are linked to each other pairwise to form a polycyclic ring system, and ii) the remaining R' are the same or different and are selected from the group consisting of —H, —OH, —F, —Cl, —Br, —I, —CN, —NO$_2$, —SO$_3$H, C$_1$-C$_e$ hydroxy alkyl.

In another particular embodiment, the at least one R' is a completely fluorinated, partially fluorinated or non-fluorinated radical selected from the group consisting of linear or branched C$_1$-C$_{30}$ alkyl, C$_1$-C$_{30}$ heteroalkyl, C$_1$-C$_{30}$ alkoxy, C$_1$-C$_{30}$ heteroalkoxy C$_1$-C$_{30}$ alkyl sulfide, C$_1$-C$_{30}$ heteroalkyl sulfide, C$_3$-C$_{12}$ cycloalkyl, C$_1$-C$_{12}$ heterocyclyl, C$_2$-C$_8$ alkenyl, C$_2$-C$_8$ heteroalkenyl, C$_2$-C$_8$ alkynyl, C$_2$-C$_8$ heteroalkynyl, C$_6$-C$_{12}$ aryl, C$_1$-C$_{12}$ heteroaryl, alkylaryl, alkylheteroaryl, alkylcyclyl, and alkylheterocyclyl.

In a more particular embodiment, the at least one R' is a fluorinated compound with a formula selected from the group consisting of

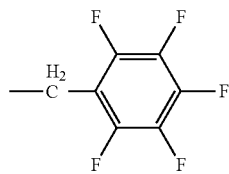

and —(CH$_2$)$_n$—(CF$_2$)$_m$—CF$_3$, wherein n=0 to 8, and m=(n+1) to (n+12). In a still more particular embodiment, the at least one R' is —(CH$_2$)$_n$—(CF$_2$)$_m$—CF$_3$, wherein n=0 to 8, and m=(n+1) to (n+12).

Particularly, A is a cation selected from 1-methyl-3-(1-H,H'-2-H,H'perfluorooctyl) imidazolium and N-methyl-N-butylpyrrolidinium.

In another particular embodiment, the ionic liquid is a perfluorinated ionic liquid.

Particular examples of the perfluorinated ionic liquids are:

a) 1-methyl-3-(1-H,H'-2-H,H'perfluorooctyl) imidazolium bis(trifluoromethanesulfonyl)imide

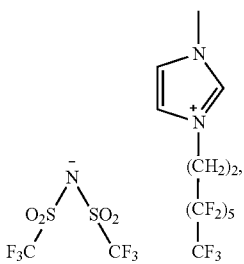

b) 1-vynil-3-(1-H,H'-2-H,H'perfluorooctyl) imidazolium bis(trifluoromethanesulfonyl)imide

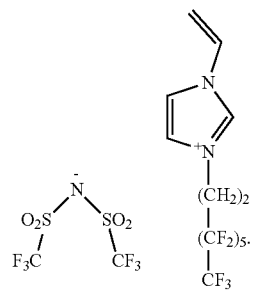

Another example of ionic liquid is N-methyl-N-butypyrrolidinium bis(trifluoromethanesulfonyl) imide

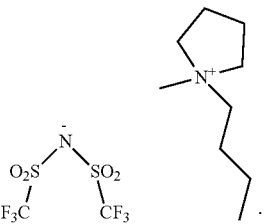

Particular examples of polymerizable ionic liquids are 1-vynil-3-(1-H,H'-2-H,H'perfluorooctyl) imidazolium bis(trifluoromethanesulfonyl)imide (V8$_F$ImTFSI), and di-1,4-(1-vinylimidazolium)butane di[bis(trifluoromethanesulfonyl)imide].

In a particular embodiment of the coating composition as defined above, the crosslinked polymeric ionic liquid is obtainable by polymerizing an ionic liquid crosslinker, and, optionally, an ionic liquid monomer of formula O$_x$B$_b$, wherein O is an organic cation comprising an omniphobic group and a polymerizable group, x is an integer from 1 to 100, particularly from 1 to 10, more particularly from 1 to 8, B is an anion with a formula selected from the group consisting of:

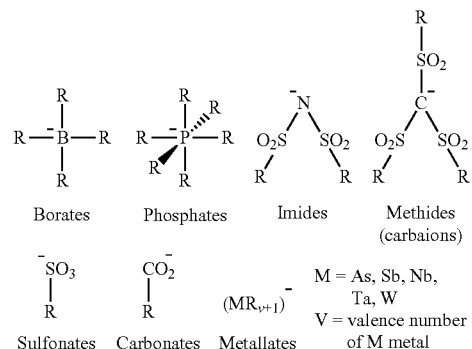

wherein

R are the same or different and are selected from the group consisting of —H, —OH, —F, —Cl, —Br, —I, —CN, —NO$_2$, —SO$_3$H, C$_1$-C$_6$ hydroxy alkyl and a completely fluorinated, partially fluorinated or non-fluorinated radical selected from the group consisting of linear or branched C$_1$-C$_{30}$ alkyl, C$_1$-C$_{30}$ heteroalkyl, C$_1$-C$_{30}$ alkoxy, C$_1$-C$_{30}$ heteroalkoxy C$_1$-C$_{30}$ alkyl sulfide, C$_1$-C$_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, $Ph_2P(O)$—, $Ph_2P$—, $(CH_3)_2P(O)$—, $(CH_3)_2P$—, $Ph_2P(S)$—, $(CH_3)_2P(S)$—, $Ph_3P=N$—, $(CH_3)_3P=N$—, $FSO_2(CH_2)_n$—, $ClSO_2(CH_2)_n$—, $HSO_3(CH_2)_n$—, $HCO_2(CH_2)_n$, $FSO_2NHSO_2(CH_2)_n$—, $CF_3SO_2NHSO_2(CH_2)_n$—, $C_nH_{2n+1}SO_2NHSO_2(CH_2)_n$—, $FSO_2(CH_2)_n$—, $ClSO_2(CH_2)_n$—, $C_nF_{2n+1}SO_2NH(CH_2)_n$—, $CH_3O$—$(Si(CH_3)_2O)_n$—, $HO$—$(Si(CH_3)_2O)_n$—, $R$—$(Si(CH_3)_2O)_n$—, wherein n is an integer having a value from 1 to 48; and wherein, optionally, two adjacent substituents R are linked to each other pairwise to form a polycyclic ring system; and b' is the integer defining the stoichiometry necessary to neutralize the positive charge of $O_x$;

in the presence of either
i) a solvent system which is a suitable organic solvent, an ionic liquid of formula $A_aB_b$ as defined herein above or below, or a mixture thereof; or alternatively
ii) an ionic liquid of formula $A_aB_b$ as a lubricant.

The polymerization/crosslinking reaction is carried out once the mixture of components is spread over the functionalised surface of the substrate to be modified.

When the polymerization/crosslinking reaction is performed by radical polymerization, a radical initiator is added to the mixture of ionic liquid crosslinker, either the solvent system or, alternatively, the ionic liquid as a lubricant, and, optionally, ionic liquid monomer.

When the polymerization/crosslinking reaction is performed by condensation, a catalyst can be added to the mixture of ionic liquid crosslinker, either the solvent system or, alternatively, the ionic liquid as a lubricant, and, optionally, the ionic liquid monomer.

In another particular embodiment, the R group is selected from the group consisting of —F and a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_6$ heteroalkynyl, $C_6$-$C_{12}$ aryl, $C_1$-$C_{12}$ heteroaryl, alkylaryl, alkylheteroaryl, alkylcyclyl, and alkylheterocyclyl.

In another particular embodiment, the R group is selected from the group consisting of —F and —$(CH_2)_n$—$(CF_2)_m$—$CF_3$, wherein n=0 to 8, and m=(n+1) to (n+12).

In a more particular embodiment, B is an anion with a formula selected from the group consisting of:

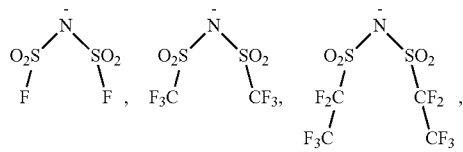

b' is the integer defining the stoichiometry necessary to neutralize the positive charge of $O_x$.

Particularly, O is an organic cation comprising at least one charged atom selected from the group consisting of $N^+$, $C^+$, $P^+$, $S^+$, and combinations thereof. More particularly, O is an organic cation comprising at least one charged atom selected from the group consisting of $N^+$, $C^+$, $P^+$, $S^+$, and combinations thereof. More particularly, O is an organic cation with a formula selected from the group consisting of:

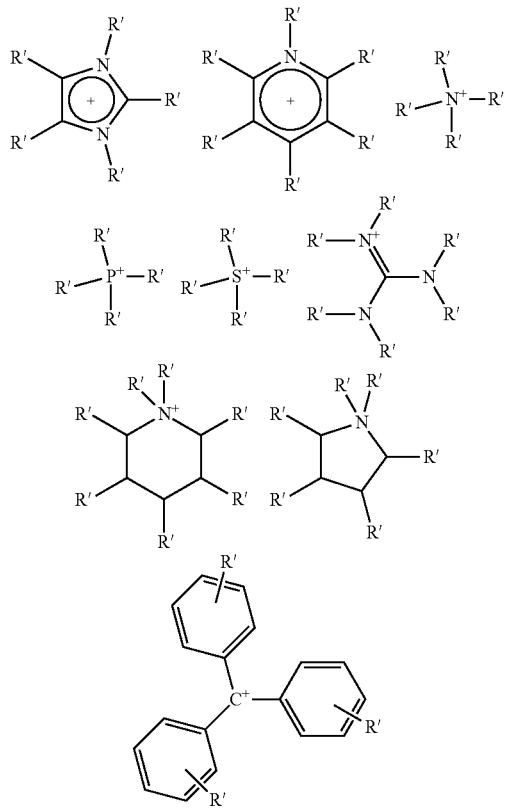

wherein
i) at least one R' is a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-C12 aryl, $C_1$-$C_{12}$ heteroaryl, alkylaryl, alkylheteroaryl, alkylcyclyl, alkylheterocyclyl, $Ph_2P(O)$—, $Ph_2P$—, $(CH_3)_2P(O)$—, $(CH_3)_2P$—, $Ph_2P(S)$—, $(CH_3)_2P(S)$—, $Ph_3P=N$—, $(CH_3)_3P=N$—, $FSO_2(CH_2)_n$—, $ClSO_2(CH_2)_n$—, $HSO_3(CH_2)_n$—, $HCO_2(CH_2)_n$, $FSO_2NHSO_2(CH_2)_n$—, $CF_3SO_2NHSO_2(CH_2)_n$—, $C_nH_{2n+1}SO_2NHSO_2(CH_2)_n$—, $FSO_2(CH_2)_n$—, $ClSO_2(CH_2)_n$—, $C_nF_{2n+1}SO_2NH(CH_2)_n$—, $CH_3O$—$(Si(CH_3)_2O)_n$—, $HO$—$(Si(CH_3)_2O)_n$—, $R$—$(Si(CH_3)_2O)_n$—, wherein n is an integer having a value from 1 to 48; and wherein, optionally, two adjacent substituents R' are linked to each other pairwise to form a polycyclic ring system,
ii) at least one R' is a polymerizable functional group, and
iii) the remaining R' are the same or different and are selected from the group consisting of $C_1$-$C_{30}$ alkyl, $C_1$-$C_{30}$ alkoxy, $C_1$-$C_{30}$ alkyl sulfide, $C_3$-$C_{12}$ cycloalkyl, $C_1$-$C_{12}$ heterocyclyl, $C_2$-$C_8$ alkenyl, $C_2$-$C_8$ alkynyl, $C_6$-$C_{12}$ aryl, $C_1$-$C_{12}$ heteroaryl, alkylaryl, alkylheteroaryl, alkylcyclyl, alkylheterocyclyl, $Ph_2P(O)$—, $Ph_2P$—, $Me_2P(O)$—, $Me_2P$—, $Ph_2P(S)$—, $Me_2P(S)$—, $Ph_3P=N$—, $Me_3P=N$—, $FSO_2CF_2$—, $ClSO_2(CF_2)_n$—, $HSO_3(CF_2)_n$—, $HCO_2(CF_2)_n$, $FSO_2NHSO_2(CF_2)_n$—, $CF_3SO_2NHSO_2(CF_2)_n$—, $C_nF_{2n+1}SO_2NHSO_2(CF_2)_n$—, $FSO_2(CF_2)_n$—, $ClSO_2(CF_2)_n$—, $C_nF_{2n+1}SO_2NH(CF_2)_n$—, —OH, —F, —Cl, —Br, —I, —CN, —NO$_2$, —SO$_3$H and C1-C$_6$ hydroxy alkyl, wherein n is an integer from 1 to 48; and wherein, optionally, two adjacent substituents R' are linked to each other pairwise to form a polycyclic ring system.

In a particular embodiment, the omniphobic R' group is a fluorinated compound with a formula selected from the group consisting of

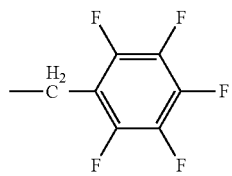

and —(CH$_2$)$_n$—(CF$_2$)$_m$—CF$_3$, wherein n=0 to 8, and m=(n+1) to (n+12).

In a particular embodiment, the polymerizable group is either independently selected from the group consisting of a vinyl, an acrylic, a methacrylic, and an allyl group, or alternatively, independently selected from the group consisting of —OH, —SH, —NH$_2$, —COOH, —C(=O)X, ester, anhydride, —NCO, —NCS, and epoxy, provided an ether, thioether, amido, ester, urethane, tiourethane, urea, or thioruea type chemical bond is obtained.

In a particular embodiment of the coating composition of the invention, the ionic liquid crosslinker is a compound of formula $S_sQ_q$-X-$Q_qS_s$, wherein Q is an organic cation independently selected from the group consisting of:

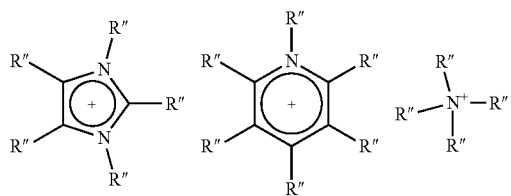

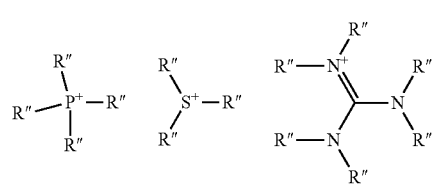

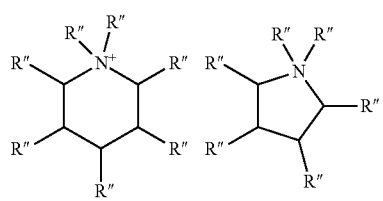

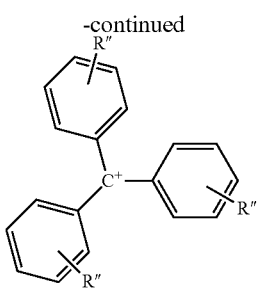

wherein
i) at least one R" is a polymerizable group, and
ii) the remaining R" are the same or different and are selected from the group consisting of H, C$_1$-C$_{30}$ alkyl, C$_1$-C$_{30}$ alkyl substituted with one or more F, C$_8$-C$_{12}$ aryl, C$_6$-C$_{12}$ aryl substituted with one or more F; and
iii) a R" of one of the two Q organic cations and a R" of the other Q organic cation are linked together and are defining a group X,
wherein, X is a birradical selected from the group consisting of (C$_1$-C$_{20}$)alkyl; (C$_1$-C$_{20}$)alkyl substituted with one or more radicals independently selected from the group consisting of: (C$_1$-C$_5$)alkyl, —OH, halogen, phenyl, phenyl substituted with one or more (C$_1$-C$_4$)alkyl radicals, phenyl substituted with one or more halogen radicals, benzyl, benzyl substituted with one or more (C$_1$-C$_4$)alkyl radicals, benzyl substituted with one or more halogen radicals, —C(=O)R$_3$, —C(=O)(R$_7$), —OC(=O)(O)R$_3$, —C(=O)(O—), —C(=O)(O)R$_3$, —OR$_3$, —CH(OR$_3$)(OR$_4$), —C(OR$_3$)(OR$_4$)(R$_5$), —C(OR$_3$)(OR$_4$)(OR$_5$), —C(OR$_3$)(OR$_4$)(OR$_5$)(OR$_6$), —NR$_1$R$_2$, —N$^+$R$_1$R$_2$R$_3$, —C(=NR$_1$)(R$_2$), —C(=O)(NR$_1$R$_2$), —N(C(=O)(R$_1$))(C(=O)(R$_2$))(R$_3$), —O(CN), —NC(=O), —ONO$_2$, —CN, —NC, —ON(=O), —NO$_2$, —NO, —C$_5$H$_4$N, —SR$_1$, SSR$_1$, —S(=O)(R$_1$), —S(=O)(=O)(R$_1$), —S(=O)(OH), —S(=O)(=O)(OH), —SCN, —NCS, —C(=S)(R$_1$), —PR$_1$R$_2$, —P(=O)(OH)$_2$, —OP(=O)(OH)$_2$, —OP(=O)(OR$_1$)(OR$_2$), —B(OH), —B(OR$_1$)(OR$_2$), and —B(OR$_1$)(R$_2$), wherein R$_1$, R$_2$, R$_3$, R$_4$, R$_5$, and R$_6$ are radicals independently selected from the group consisting of H, (C$_1$-C$_{20}$)alkyl, (C$_5$-C$_{12}$)aryl(C$_1$-C$_{20}$)alkyl, and (C$_5$-C$_{12}$)aryl; and R$_7$ is halogen;
a 2 to 20-member heteroalkyl; a 2 to 20-member heteroalkyl substituted with one or more radicals independently selected from the group consisting of: —OH, halogen, phenyl, phenyl substituted with one or more (C$_1$-C$_4$) alkyl radicals, phenyl substituted with one or more halogen radicals, benzyl, benzyl substituted with one or more (C$_1$-C$_4$)alkyl radicals, benzyl substituted with one or more halogen radicals, —C(=O)R$_3$, —C(=O)(R$_7$), —OC(=O)(O)R$_3$, —C(=O)(O$^-$), —C(=O)(O)R$_3$, —OR$_3$, —CH(OR$_3$)(OR$_4$), —C(OR$_3$)(OR$_4$)(R$_5$), —C(OR$_3$)(OR$_4$)(OR$_5$), —C(OR$_3$)(OR$_4$)(OR$_5$)(OR$_6$), —NR$_1$R$_2$, —N$^+$R$_1$R$_2$R$_3$, —C(=NR$_1$)(R$_2$), —C(=O)(NR$_1$R$_2$), —N(C(=O)(R$_1$))(C(=O)(R$_2$))(R$_3$), —O(CN), —NC(=O), —ONO$_2$, —CN, —NC, —ON(=O), —NO$_2$, —NO, —C$_5$H$_4$N, —SR$_1$, —SSR$_1$, —S(=O)(R$_1$), —S(=O)(=O)(R$_1$), —S(=O)(OH), —S(=O)(=O)(OH), —SCN, —NCS, —C(=S)(R$_1$), —PR$_1$R$_2$, —P(=O)(OH)$_2$, —OP(=O)(OH)$_2$, —OP(=O)(OR$_1$)(OR$_2$), —B(OH), —B(OR$_1$)(OR$_2$), and —B(OR$_1$)(R$_2$), wherein R$_1$, R$_2$, R$_3$, R$_4$, R$_5$, R$_6$, and R$_7$ are ase defined above;

and a homopolymer or copolymer comprising a polymeric chain selected from the group consisting of alkyd resin, epoxy resin, phenolic resin, polyvinyl halides, polyacetal, polyacrylics, polyalkylenes, polyalkenylenes, polyalkynylenes, polyamic acids, polyamides, polyamines, polyanhydrides, polyarylenealkylenes, polyarylenes, polyazomethines, polybenzimidazoles, polybenzothiazoles, polybenzyls, polycarbodiimides, polycarbonates, polycarbones, polycarboranes, polycarbosilanes, polycyanurates, polydienes, polyesterpolyurethanes, polyesters, polyetheretherketones, polyether-polyurethanes, polyethers, polyhydrazides, polyimidazoles, polyimides, polyisocyanurates, polyketones, polyolefines, polyoxyalkylenes, polyoxyphenylenes, polyphenyls, polyphosphazenes, polypyrroles, polypyrrones, polyquinolines, polyquinoxalines, polysilanes, polysilazanes, polysiloxanes, polysilsesquioxanes, polysulfides, polysulfonamides, polysulfones, polythiazoles, polythiomethylenes, polythiophenylenes, polyureas, polyurethanes, polyvinyl acetals, polyvinyl butyrals, polyvinyl formals, polyvinyl alkanoates, vinyl polymers, and natural polymers;

q is an integer from 1 to 100, particularly from 1 to 10, more particularly from 1 to 8;

S is an anion with a formula selected from the group consisting of:

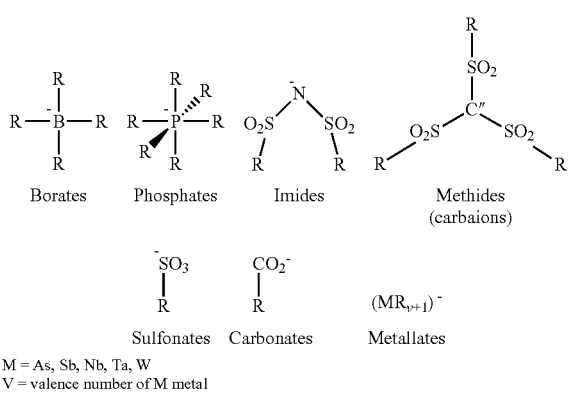

M = As, Sb, Nb, Ta, W
V = valence number of M metal wherein

R are the same or different and are selected from the group consisting of —H, —OH, —F, —Cl, —Br, —I, —CN, —NO$_2$, —SO$_3$H, $C_1$-$C_8$ hydroxy alkyl and a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-Cao heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, Ph$_2$P(O)—, Ph$_2$P—, (CH$_3$)$_2$P(O)—, (CH$_3$)$_2$P—, Ph$_2$P(S)—, (CH$_3$)$_2$P(S)—, Ph$_3$P=N—, (CH$_3$)$_3$P=N—, FSO$_2$(CH$_2$)$_n$—, ClSO$_2$(CH$_2$)$_n$—, HSO$_3$(CH$_2$)$_n$—, HCO$_2$(CH$_2$)$_n$, FSO$_2$NHSO$_2$(CH$_2$)$_n$—, CF$_3$SO$_2$NHSO$_2$(CH$_2$)$_n$—, C$_n$H$_{2n+1}$SO$_2$NHSO$_2$(CH$_2$)$_n$—, FSO$_2$(CH$_2$)$_n$—, ClSO$_2$(CH$_2$)$_n$—, C$_n$F$_{2n+1}$ SO$_2$NH(CH$_2$)$_n$—, CH$_3$O—(Si(CH$_3$)$_2$O)$_n$—, HO—(Si(CH$_3$)$_2$O)$_n$—, R—(Si(CH$_3$)$_2$O)$_n$—, wherein n is an integer having a value from 1 to 48; and wherein, optionally, two adjacent substituents R are linked to each other pairwise to form a polycyclic ring system; and s is an integer indicating the stoichiometry necessary to neutralize the positive charge of Q$_q$.

In a particular embodiment, the ionic liquid crosslinker is a compound of formula S$_s$Q$_q$-X-Q$_q$S$_s$ the R" group is selected from the group consisting of —F and a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, and alkylheterocyclyl.

In another particular embodiment, the R" group is selected from the group consisting of —F and —(CH$_2$)$_n$—(CF$_2$)$_m$—CF$_3$, wherein n=0 to 8, and m=(n+1) to (n+12).

In a more particular embodiment, S is an anion with a formula selected from the group consisting of:

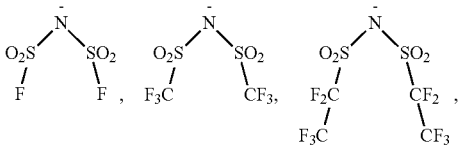

and s is an integer indicating the stoichiometry necessary to neutralize the positive charge of Q$_q$.

In a more particular embodiment, X is a birradical selected from the group consisting of ($C_1$-$C_{20}$)alkyl; ($C_1$-$C_{20}$)alkyl substituted with one or more radicals independently selected from the group consisting of ($C_1$-$C_5$)alkyl, —OH, and halogen; a 2 to 20-member heteroalkyl; a 2 to 20-member heteroalkyl substituted with one or more radicals independently selected from the group consisting of —OH and halogen.

As a way of example, in the case of a free-radical polymerization, the polymerizable groups of both the ionic liquid monomer and the ionic liquid crosslinker are independently selected from the group consisting of a vinyl, an acrylic, a methacrylic, and an allyl group.

In a particular embodiment, the crosslinker is di-1,4-(1-vinylimidazolium)butane di[bis(trifluoromethane sulfonyl) imide]

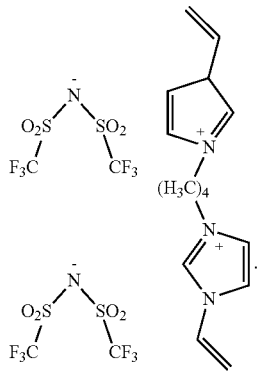

Examples of radical initiators include thermal initiators such as 2,2'-azobis(2-methylpropionitrile) and benzoyl peroxide, or a photoiniciator such as 2,2-diethoxyacetophenone. Particularly, the initiator is in an amount from 0.1 to 3.0 wt % with respect to the total weight of ionic liquid monomer and ionic liquid crosslinker.

As another way of example, in the case of condensation polymerization, the polymerizable functional groups are independently selected from the group consisting of —OH, —SH, —NH$_2$, —COOH, —C(=O)X, ester, anhydride, —NCO, —NCS, and epoxy, provided an ether, thioether, amido, ester, urethane, tiourethane, urea, or thiourea type chemical bond is obtained.

Thus, when the polymerization and crosslinking reactions are carried out by condensation polymerization, the polymerizable group of both the ionic liquid monomer and the ionic liquid crosslinker must be such that they are capable of leading to a crosslinked PIL through a condensation reaction. That means that instead of double bonds, both the ionic liquid monomer and the ionic liquid crosslinker must have at least two reactive functional groups (like alcohol, amine, or carboxylic acid groups), and at least one of the ionic liquid monomer and the ionic liquid crosslinker must have more than two reactive end functional groups.

As mentioned above, another aspect of the present invention relates to a process for the preparation of a substrate coated with the composition of the invention as defined above, wherein the coating provides omniphobic properties to the support.

Accordingly, the invention provides a process for the preparation of the coating composition as defined herein above over at least part of the surface of a substrate, the process comprising:
a) functionalizing at least part of the surface of the substrate;
b) mixing
an ionic liquid crosslinker, particularly of formula $S_sQ_q$-X-$Q_qS_s$ as defined above,
a solvent system which is a suitable organic solvent, a ionic liquid solvent of formula $A_aB_b$ as defined above, or a mixture thereof, and
optionally, an ionic liquid monomer, particularly of formula $O_xB_{b'}$ as defined above,
c) at least partially coating the surface functionalised in step a) with the mixture prepared in step b);
d) carrying out a polymerization and crosslinking reaction of the coated surface of step c),
e) removing the solvent system used in step b); and
f) spreading over the coated surface of the substrate obtained in step c) an ionic liquid as a lubricant, particularly an ionic liquid of formula $A_xB_b$ as defined herein above and below, which can be equal to or different than the ionic liquid of formula $A_aB_b$ used in step a).

The polymerization/crosslinking reaction is carried out once the mixture of components is spread over the functionalised surface of the substrate to be modified.

When the polymerization/crosslinking reaction is performed by radical polymerization, a radical initiator is added in step b), namely to the mixture of ionic liquid crosslinker, the solvent system, and, optionally, the ionic liquid monomer.

When the polymerization/crosslinking reaction is performed by condensation, a catalyst can be added in step b), namely to the mixture of ionic liquid crosslinker, the solvent system, and, optionally, the ionic liquid monomer.

In a particular embodiment, the amount of ionic liquid monomer is from 0 to 99.89 wt %, from 0.01 to 50 wt %, from 0.2 to 50 wt %, or from 0.5 to 17 wt %, with respect to the total weight of the mixture of ionic liquid crosslinker, solvent system, and ionic liquid monomer.

In another particular embodiment, the amount of ionic liquid crosslinker is from 0.1 to 99.99 wt %, from 0.5 to 90 wt %, from 1 to 80 wt %, of from 3 to 20 wt % with respect to the total weight of the mixture of ionic liquid crosslinker, solvent system, and ionic liquid monomer.

In another particular embodiment, the amount of solvent system is from 0.01 to 99.9 wt %, from 10 to 99.5 wt %, or from 30 to 97 wt %, with respect to the total weight of the mixture of ionic liquid crosslinker, solvent system, and ionic liquid monomer.

In a particular embodiment, the amount of ionic liquid added in step f) is from 0.1 to 2 µL/cm$^2$ with respect to the total coated area.

Examples of suitable organic solvents are acetone, acetonitrile, tetrahydrofurane, dimethyl sulfoxide, dimethylformamide, and dichloromethane.

Alternatively, the coating composition of the invention can be prepared over at least part of the surface of a substrate, by a process comprising:
a) functionalising at least part of the surface of the substrate;
b) mixing
an ionic liquid crosslinker, particularly of formula $S_sQ_q$-X-$Q_qS_s$ as defined above,
an ionic liquid as a lubricant, particularly an ionic liquid of formula $A_aB_b$ as defined above, and
optionally, an ionic liquid monomer, particularly of formula $O_xB_{b'}$ as defined above;
c) at least partially coating the surface functionalised in step a) with the mixture prepared in step b);
d) carrying out a polymerization and crosslinking reaction of the coated surface.

When the polymerization/crosslinking reaction is performed by radical polymerization, a radical initiator is added in step b), namely to the mixture of ionic liquid crosslinker, the ionic liquid as a lubricant, and, optionally, the ionic liquid monomer.

When the polymerization/crosslinking reaction is performed by condensation, a catalyst can be added in step b), namely to the mixture of ionic liquid crosslinker, the ionic liquid as a lubricant, and, optionally, the ionic liquid monomer.

In another particular embodiment, the ionic liquid crosslinker is in an amount from 0.1 to 99.99 wt %, from 0.3 to 70 wt %, from 0.5 to 40 wt %, with respect to the total weight of the mixture of ionic liquid crosslinker, ionic liquid as lubricant, and ionic liquid monomer.

In a particular embodiment, the amount of ionic liquid as lubricant is from 0.01 to 90 wt %, from 0.1 to 70 wt %, or from 0.5 to 40 wt %, with respect to the total weight of the mixture of ionic liquid crosslinker, ionic liquid as lubricant, and ionic liquid.

In a particular embodiment, the amount of ionic liquid monomer is from 0 to 99.89 wt %, from 0.01 to 99.6 wt %, from 0.2 to 90 wt %, with respect to the total weight of the mixture of ionic liquid crosslinker, ionic liquid as lubricant, and ionic liquid monomer.

In order to fix the crosslinked-PIL to the substrate, at least the part of the surface of the substrate to be coated with the composition of the invention must be functionalised before spreading over it the precursor solution. Processes for this functionalization are already known by those skilled in the art.

When the polymerization/crosslinking process is carried out by free-radical polymerization, the functionalization of the surface is performed by anchoring a vinyl, acryl, methacryl or allylgroup to the surface, particularly a vinyl, acryl, methacryl, or allyl group containing silane.

Thus, in a particular embodiment, the crosslinked polymeric ionic liquid is linked to a vinyl group containing silane which is anchored to a substrate surface.

As a way of example, the functionalising reaction can be carried out by:
i) firstly, generating OH-groups on the surface of the substrate by any method known to those skilled in the art such as:
UV-light soaking (380 W) for the required period of time, such as 5 to 10 min, and subsequent immersion in tap water; or
immersion of the substrate in an aqueous NaOH solution for the required period of time, such as from 5 to 10 minutes;
and subsequently
ii) reacting the functionalised surface is with a vinyl group containing silane.

The vinyl group containing silane is usually in the form of a solution in a suitable solvent, such as a mixture of water/ethanol. The reaction of the OH modified surface with the vinyl group containing silane is usually carried out at a temperature from 5 to 80° C., preferably at 50° C., for the required period of time, usually for 2 to 120 minutes, preferably for 60 min.

Examples of vinyl group containing silanes include, without being limited to, triethoxyvinylsilane, trimethoxyvinylsilane, and trichlorovinylsilane.

Similarly as above, when the polymerization/crosslinking process is carried out by condensation polymerization, the functionalization of the surface is performed by anchoring to the surface functional groups capable of reacting with the ionic liquid crosslinker, and the ionic liquid monomer, by yielding an ether, thioether, amido, ester, urethane, tiourethane, urea, or thioruea type chemical bond. The functionalization of a surface by anchoring functional groups such as —OH, —SH, —NH$_2$, —COOH, —C(=O)X, ester, anhydride, —NCO, or —NCS can be carried out by common methods already known by those skilled in the art. As mentioned above, a catalyst can be added to the mixture comprising the ionic liquid crosslinker and, optionally, the ionic liquid monomer, in order to ease the polimerization reaction as well as the reaction with the functionalized surface. Suitable catalyst are those commonly used in condensation polymerization processes and are known by those skilled in the art.

As commented above, the coating process comprises mixing an ionic liquid crosslinker as defined above (to make the polymer more rigid), an initiator, optionally a ionic liquid monomer of formula $O_xB_{b'}$ as defined above, and a non-polymerizable ionic liquid as defined above, to form a precursor solution. The precursor solution is coated onto a previously functionalized substrate (such as glass, metal, alloy, synthetic polymer, natural polymer, ceramic), and the coated support is exposed to a factor initiating the polymerization-crosslinking reaction.

After coating at least part of the surface of a substrate, the polymerization and crosslinking reactions are triggered by the activation of the initiator, which can be carried out in several ways depending on its nature. As an instance, in the case of free-radical polymerization, when a thermal initiator is used, the reaction can be triggered by heating the substrate coated with the mixture mentioned above at a temperature from 50 to 120° C., particularly to 80° C. The reaction is usually carried out under inert oxygen-free atmosphere (e.g. in $N_2$ or Ar) for the required period of time. When a photo-initiator is used, the polymerization and crosslinking reactions are triggered by exposing the substrate coated with the mixture mentioned above to UV light.

The degree of crosslinking can be controlled to get the desired consistency by adjusting the amount of ionic liquid crosslinker so that the degree of crosslinking results in a gel-like material, namely an ionogel.

The ionic liquid which will form part of the final coating composition can be added either to the precursor solution before carrying out the polymerization/crosslinking process, or to the final crosslinked-PIL.

In case the non-polymerizable ionic liquid used as lubricant is not added to the precursor solution, an ionic liquid as defined above is incorporated to the final crosslinked-PIL coating by spreading it over the coated surface.

Also forms part of the invention the coating composition as well as the coated substrate obtainable by the processes as defined above.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Reference signs related to drawings and placed in parentheses in a claim, are solely for attempting to increase the intelligibility of the claim, and shall not be construed as limiting the scope of the claim. Furthermore, the present invention covers all possible combinations of particular and preferred embodiments described herein.

EXAMPLES

Materials
1-Methylimidazole (>99%, purified by redistillation), 1-Vinylimidazole (>99%), 1,4-dibromobutane (99%) and Toluene (99.8%) and Triethoxyvinylsilane (97%) were purchased from Sigma-Aldrich and used without further purification. 1H,1H,2H,2H-Perfluorooctyl iodide 98% was acquired from ABCR, Acetone (synthesis grade), Isopropanol (synthesis grade) and Ethanol absolute (synthesis grade) from Sharlab. Finally, Lithium bis(trifluoromethanesulfonyl) imide salt (LiTFSI, 99%) was purchased from lo-li-tec (ionic Liquid Technologies).

Substrates: steel, glass and painted-steel.

Synthesis of
1-vinyl-3-(1H,1H,2H,2H-perfluorooctyl)imidazolium bis(trifluoromethanesulfonyl)imide Ionic Liquid The synthesis of vinyl-fluoroalkylimidazolium compound (V8F) was prepared using 1-vinylimidazole as a starting material and reacting it with 1H,1H,2H,2H-perfluorooctyl-iodide, according to a general procedure described in E. Azaceta et al. Electrochimica Acta, 2010, 56, pp. 42-46. The resulting iodide compound was treated with an aqueous solution of bis(trifluoromethane)sulfonimide lithium salt to replace the iodide salt with the bis(trifluoromethane)sulfonimede derivate and to obtain the final compound without any purification step.

Synthesis of
1-methyl-3-(1H,1H,2H,2H-perfluorooctyl)imidazolium
bis(trifluoromethanesulfonyl)imide Ionic Liquid The synthesis of methyl-fluoroalkylimidazolium compound (M8F) was prepared using 1-methylimidazole as a starting material and reacting it with 1H,1H,2H,2H-perfluorooctyliodide. The resulting iodide compound was treated with an aqueous solution of bis(trifluoromethane)sulfonimide lithium salt to replace the iodide salt with the bis (trifluoromethane)sulfonimede derivate and to obtain the final compound without any purification step.

Synthesis of
1,3-bis(1H,1H,2H,2H-perfluorooctyl)imidazolium
bis(trifluoromethanesulfonyl)imide Ionic Liquid The synthesis of 1,3-bisfluoroalkylimidazolium compound was prepared using imidazole as a starting material and reacting it with 1H,1H,2H,2H-perfluorooctyliodide, according to a general procedure described L. Xu et al, Journal of Organometallic Chemistry, 2000, 598, 409-416. However, the precipitate was purified in a different manner: the obtained yellow powder was rinsed with a mixture of solvents, hexane:ethyl acetate (1:1), and dried in a vacuum oven at 40° C., to afford the iodide compound as a white powder. The resulting iodide derivative was treated with an aqueous solution of bis(trifluoromethane)sulfonimide lithium salt to replace the iodide salt with the bis(trifluoromethane)sulfonimede derivate and to obtain the titled compound without any purification step.

It is worth to note that 1,3-bis(1H,1H,2H,2H-perfluorooctyl)imidazolium bis(trifluoromethanesulfonyl)imide is solid at room temperature (i.e. until 75° C.). The DSC of this compound is shown in FIG. 1.

Synthesis of the Crosslinker
1,4-di(N,N'-vinylimidazolium)butane
di-[bis(trifluoromethanesulfonyl)imide]

The synthesis of this compound followed the methodology previously reported in I. Azcune et al, Chem Sus Chem, 2014, Vol. 7, pp. 3407-3412.

Example 1—General Procedure for Direct Preparation of an Omniphobic Ionogel

Substrate Cleaning:
The substrate was firstly cleaned by dipping it in water-soap solution and sonication for 6 minutes. Then, it was rinsed with acetone and dried with an air gun. Subsequently, the substrate was dipped in acetone and sonicated for 6 minutes, rinsed with isopropanol, and dried with an air gun. Finally, the substrate was dipped in isopropanol, sonicated for 6 minutes, and dried with an air gun.
Substrate Functionalization:
The substrate's surface was functionalized by anchoring a vinyl group containing silane such as triethoxyvinylsilane. For that, firstly, OH-groups were generated on the surface of the substrate by any of the following two OH generating processes:
UV-light soaking (380 W) for 6 minutes and immersed in tap water; or
Substrate immersion in aqueous NaOH solution at 10% weight for 5 minutes; or
Substrate immersion in aqueous HCl solution at 10% during 1-5 min or
Treatment with oxygen plasma.

The sample was then dried with an air gun and immersed in a water:ethanol:triethoxyvinylsilane solution (96% ethanol, 2% water, and 2% trietoxyvinylsilane) for 5 minutes. The sample was taken from the solution and let it dry by baking in an oven at 50° C. for 60 minutes.

Preparation of the Omniphobic Ionogel

A ionogel precursor mixture containing the following components was prepared:
Perfluorinated Ionic liquid: 1-methyl-3-(1-H,H'-2-H, H'perfluorooctyl) imidazolium bis(trifluoromethanesulfonyl) imide (M8$_F$ImTFSI).
Perfluorinated monomer ionic liquid: 1-vynil-3-(1-H,H'-2-H,H'perfluorooctyl) imidazolium bis(trifluoromethanesulfonyl) imide (V8$_F$ImTFSI).
Crosslinking ionic liquid: di-1,4-(1-vinylimidazolium)butane di[bis(trifluoromethane sulfonyl)imide] (DIM).
Initiator:
Either a thermal-initiator such as 2,2'-azobis(2-methylpropionitrile) (AIBN), benzoyl peroxide or a photoiniciator such as 2,2-diethoxyacetophenone (DEAPH) was used. Usual perfluorinated monomer ionic liquid:crosslinker ratio for this example was established in 5:5 (wt %).

The ionogel precursor mixture was spread on the surface to be treated and then the initiator was added. The polymerization conditions were the following:
Thermal-initiator: 80° C. under inert oxygen-free atmosphere (e.g. $N_2$, Ar) for 3 h;
Photo-initiator: UV-light soaking for several minutes.

Example 2—General Procedure for Indirect Preparation of an Omniphobic Ionogel

A substrate was cleaned and functionalized as in Example 1. On the modified surface, an omniphobic ionogel was prepared as follows:
A precursor mixture containing the following components was prepared:
A liquid phase containing a ionic liquid such as N-methyl-N-butyl pyrrolidinium bis(trifluoromethanesulfonyl) imide (PYR14TFSI) and, optionally, an organic solvent such as acetone;
a perfluorinated monomer ionic liquid such as V8$_F$ImTFSI;
a crosslinking ionic liquid such as DIM; and
an initiator such as AIBN (thermal-initiator) or DEAPH (photoiniciator).

Usual perfluorinated monomer ionic liquid:crosslinker ionic liquid ratio for this example was established in 5:5 (wt %).

Figure 2:
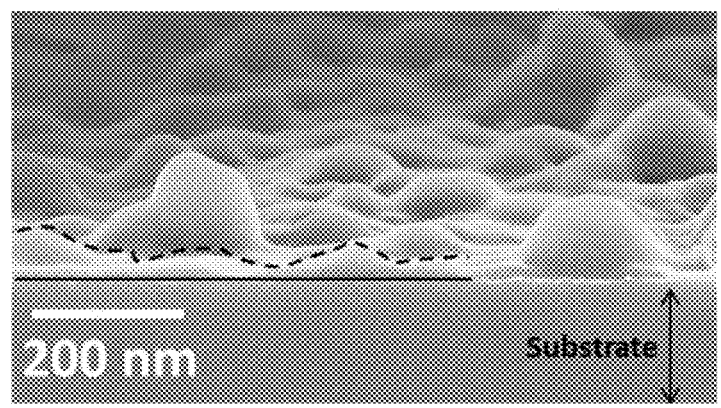
FIG. 2 shows the cross-section FE-SEM micrograph of a crosslinked polymeric ionic liquid on a glass substrate.

The precursor mixture was spread on the surface to be treated and then the surface was submitted to the following conditions depending on the initiator used:
AIBN: 80° C. under inert oxygen-free atmosphere (e.g. $N_2$, Ar) for 3 h.
DEAPH: UV-light soaking for several minutes Subsequently, the sample was immersed in acetone and sonicated for several minutes. As a result, a thin film of crosslinked polymeric ionic liquid (see FIG. 2) remained attached to the surface.

Finally, 0.8 μL/cm² of the perfluorinated ionic liquid (1-methyl-3-(1-H,H'-2-H,H'perfluorooctyl) imidazolium bis(trifluoromethanesulfonyl) imide) was spread on the surface with an air gun.

Example 3—Preparation of Omniphobic Films Showing Solid Nature at Room Temperature and Ionogel Nature at 75° C.

By benefiting of the melting point of the 1,3-bis(1H,1H,2H,2H-perfluorooctyl)imidazolium bis(trifluoromethanesulfonyl), omniphobic films showing solid nature at room temperature and ionogel nature at 75° C. were prepared. The same protocol as in example 2 was followed. However, a solution of 1,3-bis(1H,1H,2H,2H-perfluorooctyl)imidazolium bis(trifluoromethanesulfonyl) with a concentration of 0.1 g in 0.5 mL of acetone was employed, instead of 1-methyl-3-(1-H,H'-2-H,H'perfluorooctyl) imidazolium bis (trifluoromethanesulfonyl).

Example 4—Repellency to Oil Test

Figure 3:
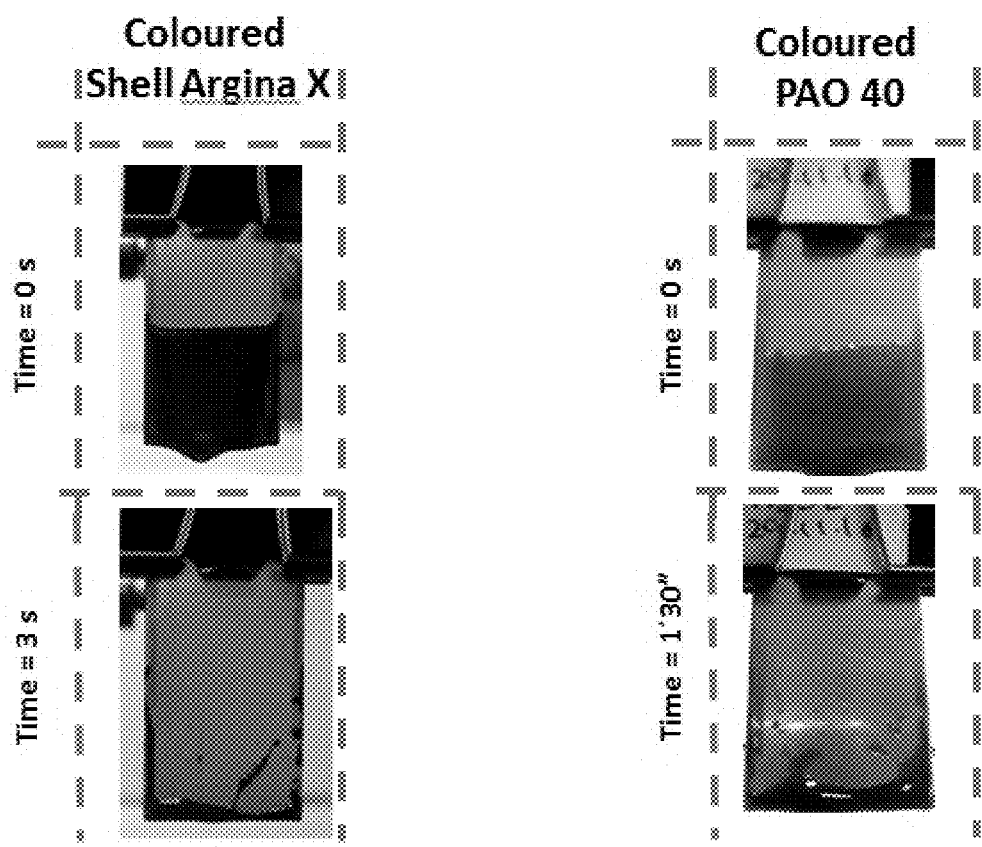
FIG. 3 shows the cleaning time of the same substrate when exposed to two oils with different chemical and physical properties.

Repellency to oil test was measured by using viscous oils with a wide range of kinematic viscosities (ranging from 135 cSt (Shell Argina X) to 396 cSt (PAO 40) at 40° C.) (FIG. 3).

Time and temperature stability was tested by permanent sample immersion at different temperatures (e.g. from room temperature to 100° C.). Then, after a certain time immersed in the oil bath, the samples were taken out from the bath while their self-cleaning response was recorded with a digital camera.

In the ageing tests, the samples were immersed in the oil bath again in order to continue with the test.

Example 5—Repellency to Oil Test for Omniphobic Films Showing Solid Nature at Room Temperature and Ionogel Nature at 75° C.

Figure 4:
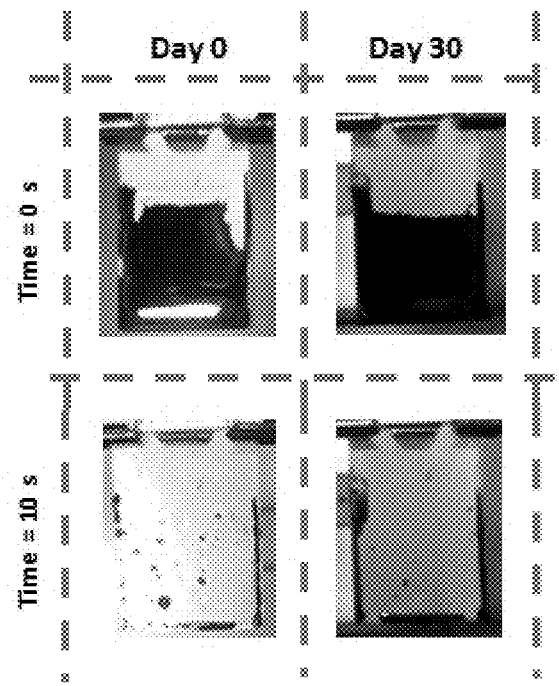
FIG. 4 shows digital pictures of omniphobic coatings showing solid nature at room temperature and ionogel nature at 75° C. (Example 3a) on steel substrates after immersion in dark oil bath. Two different times (i.e. 0 s and 10 s) are shown in top and bottom lines, respectively. The cleaning performance was also registered at different coating ages (i.e. t=0 and t=30 days).

Repellency to oil test using coatings formed with 1,3-bis (1H,1H,2H,2H-perfluorooctyl)imidazolium bis(trifluoromethanesulfonyl was measured by using viscous oils with a wide range of kinematic viscosities (ranging from 135 cSt (Shell Argina Xm, FIG. 4) to 396 cSt (PAO 40) at 40° C.).

Time and temperature stability was tested by permanent sample immersion at different temperatures (e.g. from room temperature to 100° C.). Then, after a certain time immersed in the oil bath, the samples were taken out from the bath while their self-cleaning response was recorded with a digital camera.

Example 6: Steel Samples Coated with Ionogels Obtained from Two Different Monomer:Crosslinker Ratios in the Precursor Mixture Following the process of Example 2, steel substrates in the form of plates were coated with ionogel. Two different monomer:crosslinker ratios (wt %) of 5.0:5.0 and 9.5:0.5 were used. The sliding speed of oil on the ionogel coatings were as shown in Table 1.

TABLE 1

| Sliding speed of oil on ionogel coatings with different monomer/crosslinker ratios | |
|---|---|
| Monomer (wt %):Cross Linker (wt %) | Sliding speed (cm/s) |
| 5.0:5.0 | 2.7 |
| 9.5:0.5 | 0.63 |

Example 7: Omniphobic Functionality and its Evolution Versus Ageing of Steel Samples with Coatings Obtained from Different Precursor Mixture Compositions (i.e. Monomer:Crosslinker Ratios 0:5, 5:5 and 10:0)

Figure 5:
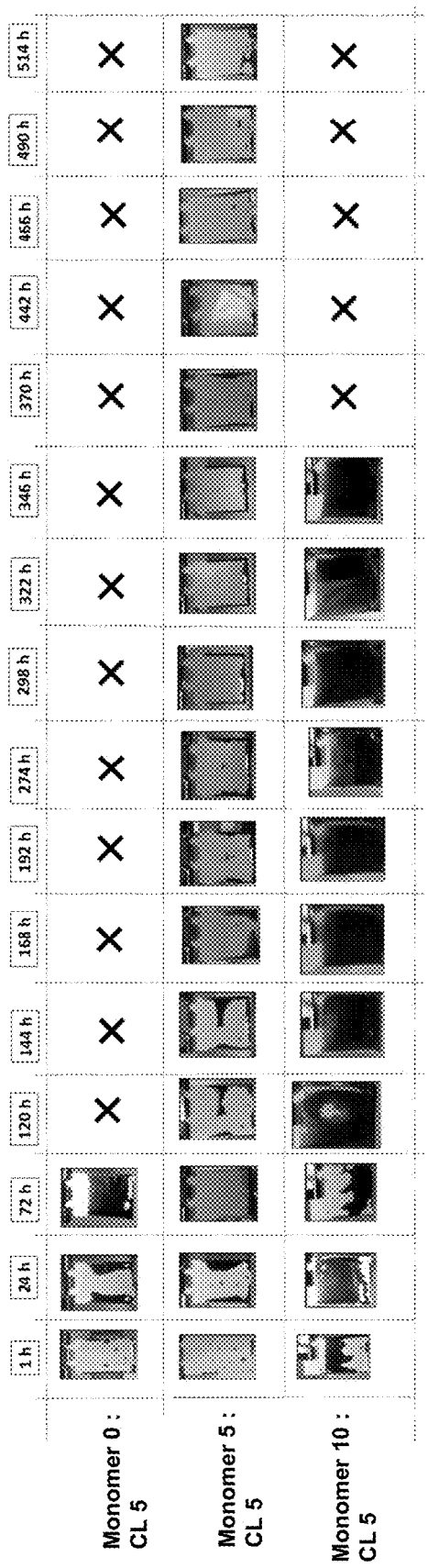
FIG. 5 shows the digital pictures of steel samples coated with ionogels synthesized from different IL monomer:crosslinker ratios (i.e. 0:5, 5:5 and 10:0) (Example 6), 1 minute after immersion in dark oil bath. Each column belongs to different ageing times.

Different precursor mixture compositions (varying the monomer:cross linker ratio 0:5, 5:5 and 10:0) anchored over steel substrates were prepared following the process of Example 2 and were subsequently aged in an oil bath for 514 hours. During this period of time, the sample cleaning performance was tested at 1, 24, 72, 120, 144, 168, 192, 274, 298, 322, 346, 370, 442, 466, 490, and 514 hours. The precursor mixture composition with a monomer:crosslinker ratio of 5:5 showed the best oil repellence and cleaning performance without decay of its initial cleaning performance (see FIG. 5).

Figure 6:
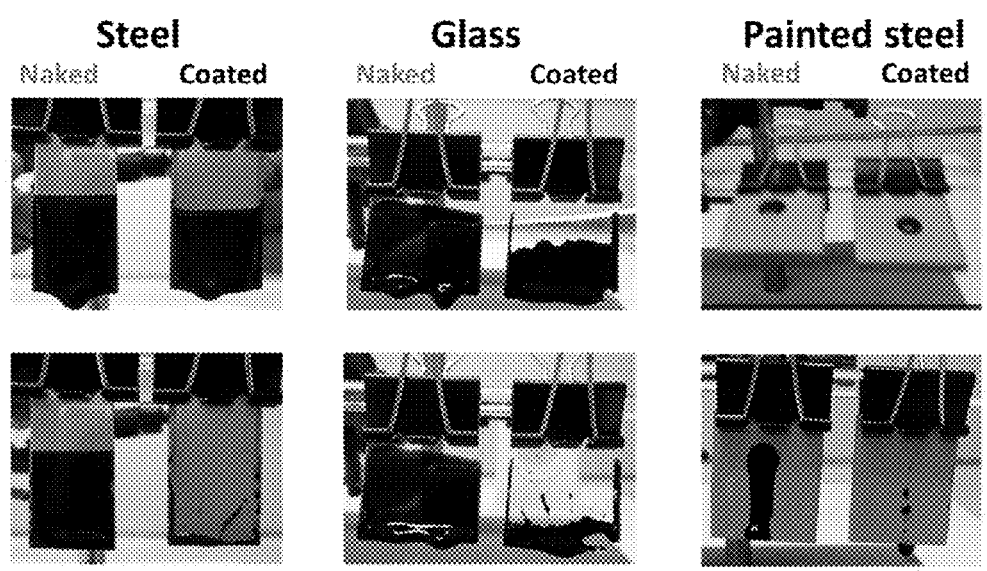
FIG. 6 shows digital pictures of ionogel coatings (Example 7) on different substrates (i.e. steel, glass and painted steel) after immersion in dark oil bath. Two different times (i.e. 0 s and 10 s) are shown in top and bottom lines, respectively. The digital pictures of the naked substrates are also shown as a reference.

Example 8: Ionogel Omniphobic Coatings Deposited on Different Substrates: Steel, Glass and Painted Steel Ionogel coatings were prepared and anchored over different material substrates: steel, glass or paint-coated steel substrates, following an analogous process to the one disclosed in Example 1. The resulting ionogel coated samples showed good self-cleaning functionality after immersion in dark oil. Oil repellency and cleaning performance did not find performance differences regardless the material substrate. Immersed samples and oil drop-tested samples were cleaned after 10 seconds (see FIG. 6).

CITATION LIST

1. WO2014209441
2. Simon, "The Crucial Divide between Hydrophobic and Hydrophilic Coatings", *Med-Tech Innovation*, http://www.med-techinnovation.com/articles/articles/article/13/The+Crucial+Divide+between++Hydrophobic+and+Hydrophilic+Coatings, Apr. 4, 2011.
3. A. A. Pitenis et al. "Lubricity from Entangled Polymer Networks on Hydrogels", *J. Tribol.*, 2016, Vol. 138(4), 042102.
4. E. Azaceta et al. "Synthesis and characterization of poly(1-vinyl-3-alkylimidazolium) iodide polymers for quasi-solid electrolytes in dye sensitized solar cells", *Electrochimica Acta*, 2010, Vol. 56, pp. 42-46.
5. L. Xu et al, *Journal of Organometallic Chemistry*, 2000, Vol. 598, 409-416.
6. I. Azcune et al, *Chem Sus Chem* 2014, Vol. 7, 3407-3412.

The invention claimed is:
1. A coating composition comprising
an ionic liquid, and
a crosslinked polymeric ionic liquid,
wherein the crosslinked polymeric ionic liquid and the ionic liquid are not linked through covalent bonds, and wherein the crosslinked polymeric ionic liquid is covalently linked to a substrate surface.

2. The coating composition of claim 1, wherein the crosslinked polymeric ionic liquid and the ionic liquid are forming an ionogel.

3. The coating composition of claim 1, wherein the ionic liquid is a compound of formula $A_aB_b$, wherein
A is an organic cation comprising at least one omniphobic group,
a is an integer from 1 to 100,
B is an anion with a formula selected from the group consisting of:

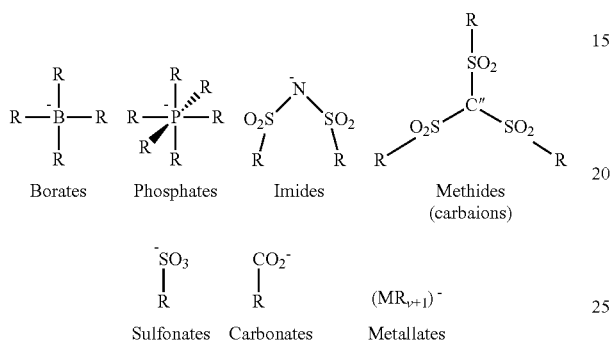

Borates    Phosphates    Imides    Methides (carbaions)

Sulfonates    Carbonates    Metallates

M = As, Sb, Nb, Ta, W
V = valence number of M metal wherein
R are the same or different and are selected from the group consisting of —H, —OH, —F, —Cl, —Br, —I, —CN, —$NO_2$, —$SO_3H$, $C_1$-$C_6$ hydroxy alkyl and a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, $Ph_2P(O)$—, $Ph_2P$—, $(CH_3)_2P(O)$—, $(CH_3)_2P$—, $Ph_2P(S)$—, $(CH_3)_2P(S)$—, $Ph_3P$=N—, $(CH_3)_3P$=N—, $FSO_2(CH_2)_n$—, $ClSO_2(CH_2)_n$—, $HSO_3(CH_2)_n$—, $HCO_2(CH_2)_n$—, $FSO_2NHSO_2(CH_2)_n$—, $CF_3SO_2NHSO_2(CH_2)_n$—, $C_nH_{2n+1}SO_2NHSO_2(CH_2)_n$—, $FSO_2(CH_2)_n$—, $ClSO_2(CH_2)_n$—, $C_nF_{2n+1}SO_2NH(CH_2)_n$—, $CH_3O$—$(Si(CH_3)_2O)_n$—, HO—$(Si(CH_3)_2O)_n$—, R—$(Si(CH_3)_2O)_n$—, wherein n is an integer having a value from 1 to 48; and wherein, optionally, two adjacent substituents R are linked to each other pairwise to form a polycyclic ring system; and
b is the integer defining the stoichiometry necessary to neutralize the positive charge of $A_a$.

4. The coating composition of claim 3, wherein A is an organic cation with a formula selected from the group consisting of:

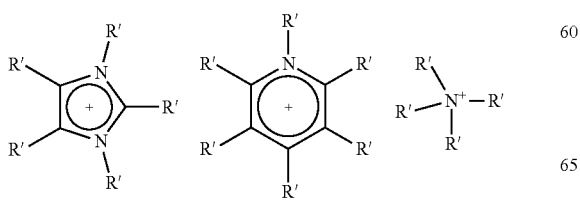

-continued

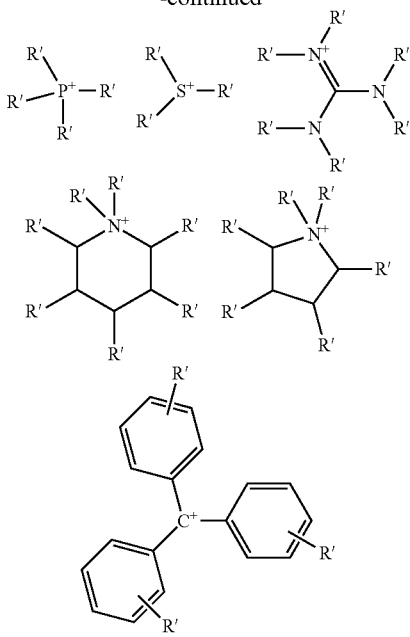

wherein
i) at least one R' is a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, $Ph_2P(O)$—, $Ph_2P$—, $(CH_3)_2P(O)$—, $(CH_3)_2P$—, $Ph_2P(S)$—, $(CH_3)_2P(S)$—, $Ph_3P$=N—, $(CH_3)_3P$=N—, $FSO_2(CH_2)_n$—, $ClSO_2(CH_2)_n$—, $HSO_3(CH_2)_n$—, $HCO_2(CH_2)_n$—, $FSO_2NHSO_2(CH_2)_n$—, $CF_3SO_2NHSO_2(CH_2)_n$—, $C_nH_{2n+1}SO_2NHSO_2(CH_2)_n$—, $FSO_2(CH_2)_n$—, $ClSO_2(CH_2)_n$—, $C_nF_{2n+1}SO_2NH(CH_2)_n$—, $CH_3O$—$(Si(CH_3)_2O)_n$—, HO—$(Si(CH_3)_2O)_n$—, R—$(Si(CH_3)_2O)_n$—, wherein n is an integer having a value from 1 to 48;
and wherein, optionally, two adjacent substituents R' are linked to each other pairwise to form a polycyclic ring system, and
ii) the remaining R' are the same or different and are selected from the group consisting of —H, —OH, —F, —Cl, —Br, —I, —CN, —$NO_2$, —$SO_3H$, $C_1$-$C_6$ hydroxy alkyl.

5. The coating composition of claim 4, wherein the at least one R' is a fluorinated compound with a formula selected from the group consisting of

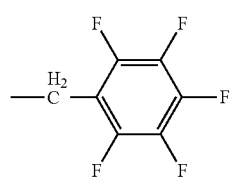

and —$(CH_2)_n$—$(CF_2)_m$—$CF_3$, wherein n=0 to 8, and m=(n+1) to (n+12).

6. The coating composition of claim 1, wherein the crosslinked polymeric ionic liquid is obtainable by polymerizing an ionic liquid crosslinker, and, optionally, an ionic liquid monomer of formula $O_xB_{b'}$, wherein O is an organic cation comprising an omniphobic group and a polymerizable group, x is an integer from 1 to 100, B is an anion with a formula selected from the group consisting of:

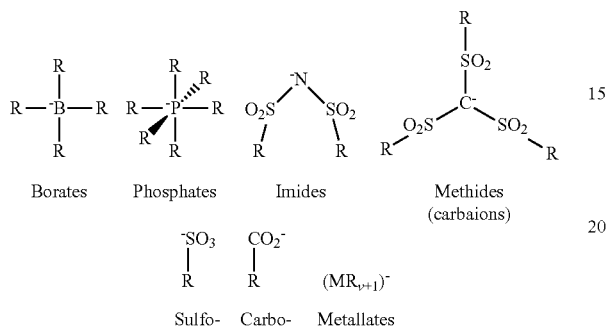

Borates   Phosphates   Imides   Methides (carbaions)

Sulfonates   Carbonates   Metallates

M = As, Sb, Nb, Ta, W
V = valence number of M metal wherein

R are the same or different and are selected from the group consisting of —H, —OH, —F, —Cl, —Br, —I, —CN, —$NO_2$, —$SO_3H$, $C_1$-$C_6$ hydroxy alkyl and a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, $Ph_2P(O)$—, $Ph_2P$—, $(CH_3)_2P(O)$—, $(CH_3)_2P$—, $Ph_2P(S)$—, $(CH_3)_2P(S)$—, $Ph_3P=N$—, $(CH_3)_3P=N$—, $FSO_2(CH_2)_n$—, $ClSO_2(CH_2)_n$—, $HSO_3(CH_2)_n$—, $HCO_2(CH_2)_n$—, $FSO_2NHSO_2(CH_2)_n$—, $CF_3SO_2NHSO_2(CH_2)_n$—, $C_nH_{2n+1}SO_2NHSO_2(CH_2)_n$—, $FSO_2(CH_2)_n$—, $ClSO_2(CH_2)_n$—, $C_nF_{2n+1}SO_2NH(CH_2)_n$—, $CH_3O$—$(Si(CH_3)_2O)_n$—, $HO$—$(Si(CH_3)_2O)_n$—, R—$(Si(CH_3)_2O)_n$—, wherein n is an integer having a value from 1 to 48; and wherein, optionally, two adjacent substituents R are linked to each other pairwise to form a polycyclic ring system; and b' is the integer defining the stoichiometry necessary to neutralize the positive charge of $O_x$;

in the presence of either i) a solvent system which is a suitable organic solvent, a ionic liquid of formula $A_aB_b$, or a mixture thereof, wherein A is an organic cation comprising at least one omniphobic group, a is an integer from 1 to 8, B is as defined above, and b is the integer defining the stoichiometry necessary to neutralize the positive charge of $A_a$; or alternatively ii) an ionic liquid of formula $A_aB_b$ as a lubricant.

7. The coating composition of claim 6, wherein

O is an organic cation with a formula selected from the group consisting of:

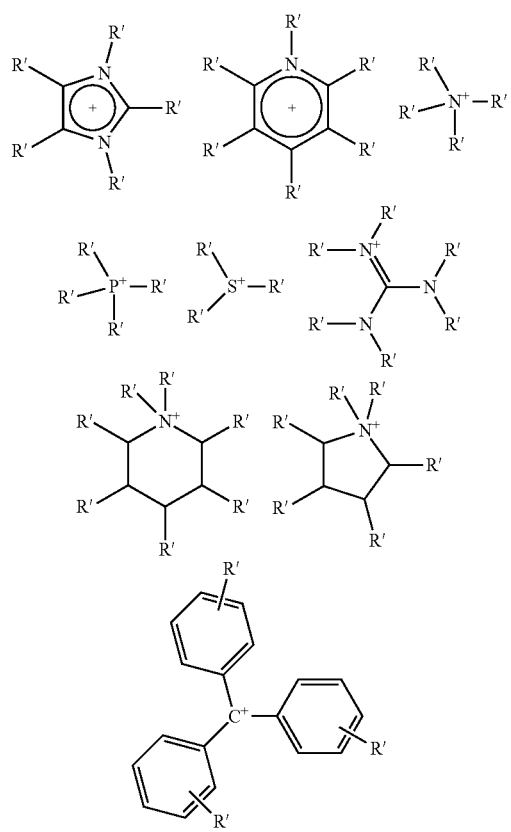

wherein i) at least one R' is a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, $Ph_2P(O)$—, $Ph_2P$—, $(CH_3)_2P(O)$—, $(CH_3)_2P$—, $Ph_2P(S)$—, $(CH_3)_2P(S)$—, $Ph_3P=N$—, $(CH_3)_3P=N$—, $FSO_2(CH_2)_n$—, $ClSO_2(CH_2)_n$—, $HSO_3(CH_2)_n$—, $HCO_2(CH_2)_n$, $FSO_2NHSO_2(CH_2)_n$—, $CF_3SO_2NHSO_2(CH_2)_n$—, $C_nH_{2n+1}SO_2NHSO_2(CH_2)_n$—, $FSO_2(CH_2)_n$—, $ClSO_2(CH_2)_n$—, $C_nF_{2n+1}SO_2NH(CH_2)_n$—, $CH_3O$—$(Si(CH_3)_2O)_n$—, $HO$—$(Si(CH_3)_2O)_n$—, R—$(Si(CH_3)_2O)_n$—, wherein n is an integer having a value from 1 to 48; and wherein, optionally, two adjacent substituents R are linked to each other pairwise to form a polycyclic ring system, ii) at least one R' is a polymerizable group, and iii) the remaining R are the same or different and are selected from the group consisting of $C_1$-$C_{30}$ alkyl, $C_1$-$C_{30}$ alkoxy, $C_1$-$C_{30}$ alkyl sulfide, $C_3$-$C_{12}$ cycloalkyl, $C_1$-$C_{12}$ heterocyclyl, $C_2$-$C_8$ alkenyl, $C_2$-$C_8$ alkynyl, $C_6$-$C_{12}$ aryl, $C_1$-$C_{12}$ heteroaryl, alkylaryl, alkylheteroaryl, alkylcyclyl, alkylheterocyclyl, $Ph_2P(O)$—, $Ph_2P$—, $Me_2P(O)$—, $Me_2P$—, $Ph_2P(S)$—, $Me_2P(S)$—, $Ph_3P=N$—, $Me_3P=N$—, $FSO_2CF_2$—, $ClSO_2(CF_2)_n$—, $HSO_3(CF_2)_n$—, $HCO_2(CF_2)_n$, $FSO_2NHSO_2(CF_2)_n$—, $CF_3SO_2NHSO_2(CF_2)_n$—, $C_nF_{2n+1}$ $SO_2NHSO_2(CF_2)_n-$, $FSO_2(CF_2)_n-$, $ClSO_2(CF_2)_n-$, $C_nF_{2n+1}$ $SO_2NH(CF_2)_n-$, —OH, —F, —Cl, —Br, —I, —CN, —NO$_2$, —SO$_3$H and $C_1$-$C_6$ hydroxy alkyl, wherein n is an integer from 1 to 48; and wherein, optionally, two adjacent substituents R are linked to each other pairwise to form a polycyclic ring system; and A is an organic cation with a formula selected from the group consisting of:

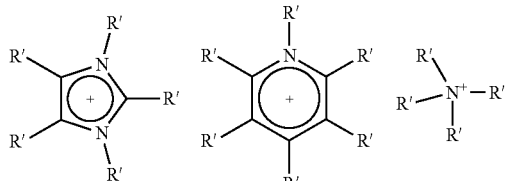

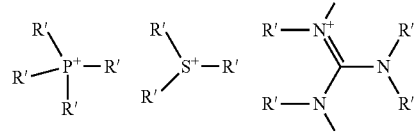

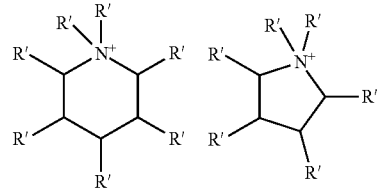

wherein
i) at least one R' is a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, $Ph_2P(O)-$, $Ph_2P-$, $(CH_3)_2P(O)-$,

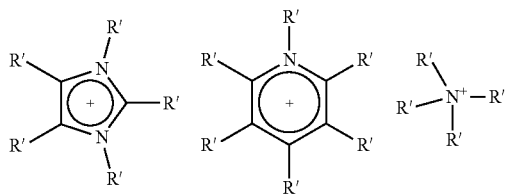

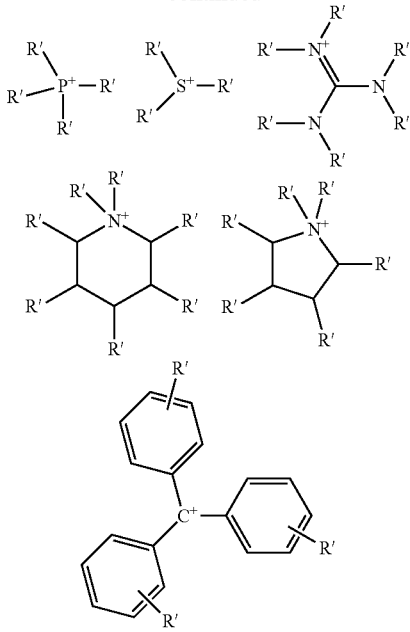

wherein
i) at least one R" is a polymerizable group, and
ii) a R" of one of the two Q organic cations and a R" of the other Q organic cation are linked together and are defining a group X,
wherein, X is a birradical selected from the group consisting of: ($C_1$-$C_{20}$)alkyl; ($C_1$-$C_{20}$)alkyl substituted with one or more radicals independently selected from the group consisting of: ($C_1$-$C_5$)alkyl, —OH, halogen, phenyl, phenyl substituted with one or more ($C_1$-$C_4$)alkyl radicals, phenyl substituted with one or more halogen radicals, benzyl, benzyl substituted with one or more ($C_1$-$C_4$)alkyl radicals, benzyl substituted with one or more halogen radicals, —C(=O)R$_3$, —C(=O)(R$_7$), —OC(=O)(O)R$_3$, —C(=O)(O$^-$), —C(=O)(O)R$_3$, —OR$_3$, —CH(OR$_3$)(OR$_4$), —C(OR$_3$)(OR$_4$)(R$_5$), —C(OR$_3$)(OR$_4$)(OR$_5$), —C(OR$_3$)(OR$_4$)(OR$_5$)(OR$_6$), —NR$_1$R$_2$, —N$^+$R$_1$R$_2$R$_3$, —C(=NR$_1$)(R$_2$), —C(=O)(NR$_1$R$_2$), —N(C(=O)(R$_1$)) (C(=O)(R$_2$))(R$_3$), —O(CN), —NC(=O), —ONO$_2$, —CN, —NC, —ON(=O), —NO$_2$, —NO, —C$_5$H$_4$N, —SR$_1$, SSR$_1$, —S(=O)(R$_1$), —S(=O)(=O)(R$_1$), —S(=O)(OH), —S(=O)(=O)(OH), —SCN, —NCS, —C(=S)(R$_1$), —PR$_1$R$_2$, —P(=O)(OH)$_2$, —OP(=O)(OH)$_2$, —OP(=O)(OR$_1$)(OR$_2$), —B(OH), —B(OR$_1$)(OR$_2$) and —B(OR$_1$)(R$_2$), wherein R$_1$, R$_2$, R$_3$, R$_4$, R$_5$, and R$_6$ are radicals independently selected from the group consisting of H, ($C_1$-$C_{20}$)alkyl, ($C_5$-$C_{12}$)aryl ($C_1$-$C_{20}$)alkyl, and ($C_5$-$C_{12}$)aryl; and R$_7$ is halogen; a 2 to 20-member heteroalkyl; a 2 to 20-member heteroalkyl substituted with one or more radicals independently selected from the group consisting of: —OH, halogen, phenyl, phenyl substituted with one or more ($C_1$-$C_4$)alkyl radicals, phenyl substituted with one or more halogen radicals, benzyl, benzyl substituted with one or more ($C_1$-$C_4$)alkyl radicals, benzyl substituted with one or more halogen radicals, (CH$_3$)$_2$P—, Ph$_2$P(S)—, (CH$_3$)$_2$P(S)—, Ph$_3$P=N—, (CH$_3$)$_3$P=N—, FSO$_2$(CH$_2$)$_n$—, ClSO$_2$ $(CH_2)_n$—, $HSO_3(CH_2)_n$—, $HCO_2(CH_2)_n$, $FSO_2NHSO_2(CH_2)_n$—, $CF_3SO_2NHSO_2(CH_2)_n$—, $C_nH_{2n+1}SO_2NHSO_2(CH_2)_n$—, $FSO_2(CH_2)_n$—, $ClSO_2(CH_2)_n$—, $C_nF_{2n+1}SO_2NH(CH_2)_n$—, $CH_3O$—$(Si(CH_3)_2O)_n$—, $HO$—$(Si(CH_3)_2O)_n$—, $R$—$(Si(CH_3)_2O)_n$—, wherein n is an integer having a value from 1 to 48; and wherein, optionally, two adjacent substituents R are linked to each other pairwise to form a polycyclic ring system, and ii) the remaining R' are the same or different and are selected from the group consisting of —H, —OH, —F, —Cl, —Br, —I, —CN, —NO₂, —SO₃H, $C_1$-$C_6$ hydroxy alkyl.

8. The coating composition of claim 7, wherein the omniphobic R' group is a fluorinated compound with a formula selected from the group consisting of

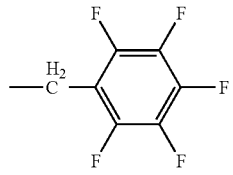

and —$(CH_2)_n$—$(CF_2)_m$—$CF_3$, wherein n=0 to 8, and m=(n+1) to (n+12).

9. The coating composition of claim 6, wherein the polymerizable group is either independently selected from the group consisting of a vinyl, an acrylic, a methacrylic, and an allyl group, or alternatively, independently selected from the group consisting of —OH, —SH, —NH₂, —COOH, —C(=O)X, ester, anhydride, —NCO, —NCS, and epoxy, provided an ether, thioether, amido, ester, urethane, tiourethane, urea, or thioruea type chemical bond is obtained.

10. The coating composition of claim 6, wherein
the ionic liquid crosslinker is a compound of formula $S_sQ_q$-X-$Q_qS_s$, wherein
Q is an organic cation independently selected from the group consisting of: —C(=O)R₃, —C(=O)(R₇), —OC(=O)(O)R₃, —C(=O)(0-), —C(=O)(O)R₃, —OR₃, —CH(OR₃)(OR₄), —C(OR₃)(OR₄)(R₅), —C(OR₃)(OR₄)(OR₅), —C(OR₃)(OR₄)(OR₅)(OR₆), —NR₁R₂, —N⁺R₁R₂R₃, —C(=NR₁)(R₂), —C(=O) (NR₁R₂), —N(C(=O)(R₁)) (C(=O)(R₂))(R₃), —O(CN), —NC(=O), —ONO₂, —CN, —NC, —ON (=O), —NO₂, —NO, —C₅H₄N, —SR₁, —SSR₁, —S(=O)(R₁), —S(=O)(=O)(R₁), —S(=O)(OH), —S(=O)(=O)(OH), —SCN, —NCS, —C(=S)(R₁), —PR₁R₂, —P(=O)(OH)₂, —OP(=O)(OH)₂, —OP (=O)(OR₁)(OR₂), —B(OH), —B(OR₁)(OR₂) and —B(OR₁)(R₂), wherein R₁, R₂, R₃, R₄, R₅, R₆, and R₇ are as defined above; and a homopolymer or copolymer comprising a polymeric chain selected from the group consisting of: alkyd resin, epoxy resin, phenolic resin, polyvinyl halides, polyacetal, polyacrylics, polyalkylenes, polyalkenylenes, polyalkynylenes, polyamic acids, polyamides, polyamines, polyanhydrides, polyarylenealkylenes, polyarylenes, polyazomethines, polybenzimidazoles, polybenzothiazoles, polybenzyls, polycarbodiimides, polycarbonates, polycarbones, polycarboranes, polycarbosilanes, polycyanurates, polydienes, polyester-polyurethanes, polyesters, polyetheretherketones, polyether-polyurethanes, polyethers, polyhydrazides, polyimidazoles, polyimides, polyisocyanurates, polyketones, polyolefines, polyoxyalkylenes, polyoxyphenylenes, polyphenyls, polyphosphazenes, polypyrroles, polypyrrones, polyquinolines, polyquinoxalines, polysilanes, polysilazanes, polysiloxanes, polysilsesquioxanes, polysulfides, polysulfonamides, polysulfones, polythiazoles, polythiomethylenes, polythiophenylenes, polyureas, polyurethanes, polyvinyl acetals, polyvinyl butyrals, polyvinyl formals, polyvinyl alkanoates, vinyl polymers, and natural polymers; and iii) the remaining R" are the same or different and are selected from the group consisting of H, $C_1$-$C_{30}$ alkyl, $C_1$-$C_{30}$ alkyl substituted with one or more F, $C_6$-$C_{12}$ aryl, $C_6$-$C_{12}$ aryl substituted with one or more F;

q is an integer from 1 to 100,

S is an anion with a formula selected from the group consisting of:

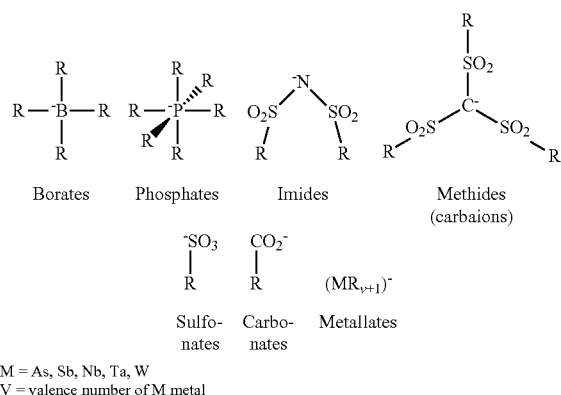

M = As, Sb, Nb, Ta, W
V = valence number of M metal wherein

R are the same or different and are selected from the group consisting of —H, —OH, —F, —Cl, —Br, —I, —CN, —NO₂, —SO₃H, $C_1$-$C_6$ hydroxy alkyl and a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, Ph₂P(O)—, Ph₂P—, (CH₃)₂P (O)—, (CH₃)₂P—, Ph₂P(S)—, (CH₃)₂P(S)—, Ph₃P=N—, (CH₃)₃P=N—, FSO₂(CH₂)ₙ—, ClSO₂(CH₂)ₙ—, HSO₃(CH₂)ₙ—, HCO₂(CH₂)ₙ, FSO₂NHSO₂(CH₂)ₙ—, CF₃SO₂NHSO₂(CH₂)ₙ—, $C_nH_{2n+1}SO_2NHSO_2(CH_2)_n$—, FSO₂(CH₂)ₙ—, ClSO₂(CH₂)ₙ—, $C_nF_{2n+1}SO_2NH(CH_2)_n$—, CH₃O—(Si (CH₃)₂O)ₙ—, HO—(Si(CH₃)₂O)ₙ—, R—(Si(CH₃)₂O)ₙ—, wherein n is an integer having a value from 1 to 48; and wherein, optionally, two adjacent substituents R are linked to each other pairwise to form a polycyclic ring system; and s is an integer indicating the stoichiometry necessary to neutralize the positive charge of $Q_q$.

11. A process for the preparation of a coating composition as defined in claim 1, over at least part of the surface of a substrate, the process comprising:

a) functionalising at least part of the surface of the substrate;
b) mixing
an ionic liquid crosslinker,
a solvent system which is a suitable organic solvent, or a non-polymerizable ionic liquid of formula $A_aB_b$, wherein
A is an organic cation comprising at least one omniphobic group,
a is an integer from 1 to 100,
B is an anion with a formula selected from the group consisting of:

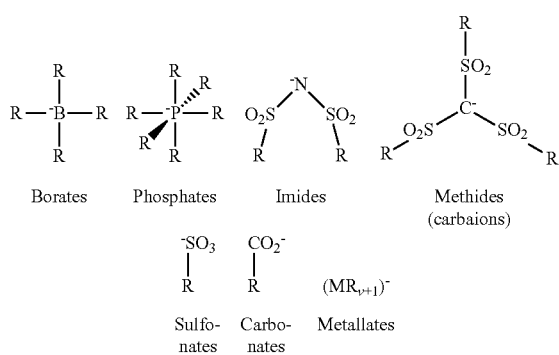

Borates    Phosphates    Imides    Methides (carbaions)

Sulfonates    Carbonates    Metallates

M = As, Sb, Nb, Ta, W
V = valence number of M metal wherein
R are the same or different and are selected from the group consisting of —H, —OH, —F, —Cl, —Br, —I, —CN, —NO$_2$, —SO$_3$H, $C_1$-$C_6$ hydroxy alkyl and a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, Ph$_2$P(O)—, Ph$_2$P—, (CH$_3$)$_2$P(O)—, (CH$_3$)$_2$P—, Ph$_2$P(S)—, (CH$_3$)$_2$P(S)—, Ph$_3$P=N—, (CH$_3$)$_3$P=N—, FSO$_2$(CH$_2$)$_n$—, ClSO$_2$(CH$_2$)$_n$—, HSO$_3$(CH$_2$)$_n$—, HCO$_2$(CH$_2$)$_n$, FSO$_2$NHSO$_2$(CH$_2$)$_n$—, CF$_3$SO$_2$NHSO$_2$(CH$_2$)$_n$—, $C_nH_{2n+1}$SO$_2$NHSO$_2$(CH$_2$)$_n$—, FSO$_2$(CH$_2$)$_n$—, ClSO$_2$(CH$_2$)$_n$—, $C_nF_{2n+1}$SO$_2$NH(CH$_2$)$_n$—, CH$_3$O—(Si(CH$_3$)$_2$O)$_n$—, HO—(Si(CH$_3$)$_2$O)$_n$—, R—(Si(CH$_3$)$_2$O)$_n$—, wherein n is an integer having a value from 1 to 48; and wherein, optionally, two adjacent substituents R are linked to each other pairwise to form a polycyclic ring system; and b' is the integer defining the stoichiometry necessary to neutralize the positive charge of $O_x$, and
b is the integer defining the stoichiometry necessary to neutralize the positive charge of $A_a$; and
optionally, an ionic liquid monomer, wherein
c) at least partially coating the surface functionalised in step a) with the mixture prepared in step b);
d) carrying out a polymerization and crosslinking reaction of the coated surface of step c),
e) removing the solvent system used in step b); and
f) spreading over the coated surface of the substrate obtained in step d) an ionic liquid as a lubricant.

12. The process of claim 11, wherein the amount of ionic liquid monomer is from 0 to 99.89 wt %, from 0.01 to 50 wt %, from 0.2 to 50 wt %, or from 0.5 to 17 wt %, with respect to the total weight of the mixture of ionic liquid crosslinker, solvent system, and ionic liquid monomer.

13. The process of claim 11, wherein the amount of ionic liquid crosslinker is from 0.1 to 99.99 wt %, from 0.5 to 90 wt %, from 1 to 80 wt %, of from 3 to 20 wt % with respect to the total weight of the mixture of ionic liquid crosslinker, solvent system, and ionic liquid monomer.

14. A process for the preparation of a coating composition as defined in claim 1, over at least part of the surface of a substrate, the process comprising:
a) functionalising at least part of the surface of the substrate;
b) mixing
an ionic liquid crosslinker,
an ionic liquid as a lubricant, and
optionally, an ionic liquid monomer;
c) at least partially coating the surface functionalised in step a) with the mixture prepared in step b);
d) carrying out a polymerization and crosslinking reaction of the coated surface.

15. An article of manufacture coated with the coating composition of claim 1.

16. The coating composition of claim 2, wherein the ionic liquid is a compound of formula $A_aB_b$, wherein
A is an organic cation comprising at least one omniphobic group,
a is an integer from 1 to 100,
B is an anion with a formula selected from the group consisting of:

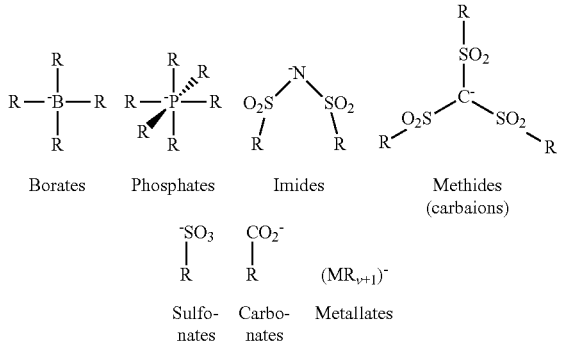

Borates    Phosphates    Imides    Methides (carbaions)

Sulfonates    Carbonates    Metallates

M = As, Sb, Nb, Ta, W
V = valence number of M metal wherein
R are the same or different and are selected from the group consisting of —H, —OH, —F, —Cl, —Br, —I, —CN, —NO$_2$, —SO$_3$H, $C_1$-$C_6$ hydroxy alkyl and a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, Ph$_2$P(O)—, Ph$_2$P—, (CH$_3$)$_2$P(O)—, (CH$_3$)$_2$P—, Ph$_2$P(S)—, (CH$_3$)$_2$P(S)—, Ph$_3$P=N—, (CH$_3$)$_3$P=N—, FSO$_2$(CH$_2$)$_n$—, ClSO$_2$(CH$_2$)$_n$—, HSO$_3$(CH$_2$)$_n$—, HCO$_2$(CH$_2$)$_n$, FSO$_2$NHSO$_2$(CH$_2$)$_n$—, CF$_3$SO$_2$NHSO$_2$(CH$_2$)$_n$—, C$_n$H$_{2n+1}$ SO$_2$NHSO$_2$(CH$_2$)$_n$—, FSO$_2$(CH$_2$)$_n$—, ClSO$_2$(CH$_2$)$_n$—, C$_n$F$_{2n+1}$ SO$_2$NH(CH$_2$)$_n$—, CH$_3$O—(Si(CH$_3$)$_2$O)$_n$—, HO—(Si(CH$_3$)$_2$O)$_n$—, R—(Si(CH$_3$)$_2$O)$_n$—, wherein n is an integer having a value from 1 to 48; and wherein, optionally, two adjacent substituents R are linked to each other pairwise to form a polycyclic ring system; and b is the integer defining the stoichiometry necessary to neutralize the positive charge of A$_a$.

17. The coating composition of claim 16, wherein A is an organic cation with a formula selected from the group consisting of:

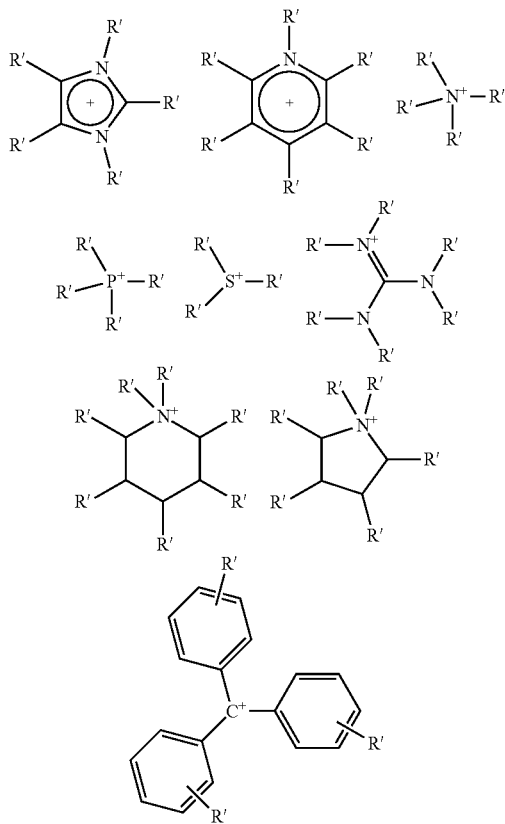

wherein
i) at least one R' is a completely fluorinated, partially fluorinated or non-fluorinated radical selected from the group consisting of linear or branched C$_1$-C$_{30}$ alkyl, C$_1$-C$_{30}$ heteroalkyl, C$_1$-C$_{30}$ alkoxy, C$_1$-C$_{30}$ heteroalkoxy C$_1$-C$_{30}$ alkyl sulfide, C$_1$-C$_{30}$ heteroalkyl sulfide, C$_3$-C$_{12}$ cycloalkyl, C$_1$-C$_{12}$ heterocyclyl, C$_2$-C$_8$ alkenyl, C$_2$-C$_8$ heteroalkenyl, C$_2$-C$_8$ alkynyl, C$_2$-C$_8$ heteroalkynyl, C$_6$-C$_{12}$ aryl, C$_1$-C$_{12}$ heteroaryl, alkylaryl, alkylheteroaryl, alkylcyclyl, alkylheterocyclyl, Ph$_2$P(O)—, Ph$_2$P—, (CH$_3$)$_2$P(O)—, (CH$_3$)$_2$P—, Ph$_2$P(S)—, (CH$_3$)$_2$P(S)—, Ph$_3$P=N—, (CH$_3$)$_3$P=N—, FSO$_2$(CH$_2$)$_n$—, ClSO$_2$(CH$_2$)$_n$—, HSO$_3$(CH$_2$)$_n$—, HCO$_2$(CH$_2$)$_n$, FSO$_2$NHSO$_2$(CH$_2$)$_n$—, CF$_3$SO$_2$NHSO$_2$(CH$_2$)$_n$—, C$_n$H$_{2n+1}$ SO$_2$NHSO$_2$(CH$_2$)$_n$—, FSO$_2$(CH$_2$)$_n$—, ClSO$_2$(CH$_2$)$_n$—, C$_n$F$_{2n+1}$ SO$_2$NH(CH$_2$)$_n$—, CH$_3$O—(Si(CH$_3$)$_2$O)$_n$—, HO—(Si(CH$_3$)$_2$O)$_n$—, R—(Si(CH$_3$)$_2$O)$_n$—, wherein n is an integer having a value from 1 to 48; and wherein, optionally, two adjacent substituents R' are linked to each other pairwise to form a polycyclic ring system, and ii) the remaining R' are the same or different and are selected from the group consisting of —H, —OH, —F, —Cl, —Br, —I, —CN, —NO$_2$, —SO$_3$H, C$_1$-C$_6$ hydroxy alkyl.

18. The coating composition of claim 17, wherein the at least one R' is a fluorinated compound with a formula selected from the group consisting of

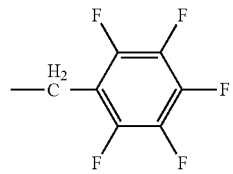

and —(CH$_2$)$_n$—(CF$_2$)$_m$—CF$_3$, wherein n=0 to 8, and m=(n+1) to (n+12).

19. The coating composition of claim 16, wherein the crosslinked polymeric ionic liquid is obtainable by polymerizing an ionic liquid crosslinker, and, optionally, an ionic liquid monomer of formula O$_x$B$_b$, wherein O is an organic cation comprising an omniphobic group and a polymerizable group, x is an integer from 1 to 100, B is an anion with a formula selected from the group consisting of:

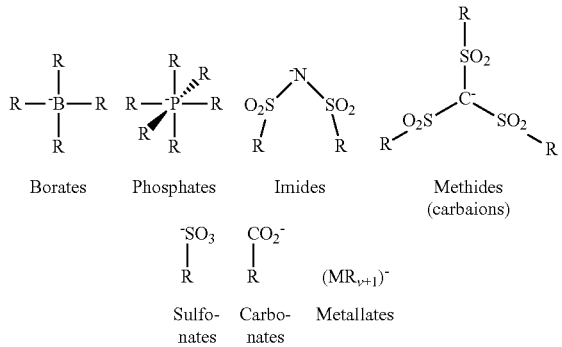

M = As, Sb, Nb, Ta, W
V = valence number of M metal wherein
R are the same or different and are selected from the group consisting of —H, —OH, —F, —Cl, —Br, —I, —CN, —NO$_2$, —SO$_3$H, C$_1$-C$_6$ hydroxy alkyl and a completely fluorinated, partially fluorinated or non-fluorinated radical selected from the group consisting of linear or branched C$_1$-C$_{30}$ alkyl, C$_1$-C$_{30}$ heteroalkyl, C$_1$-C$_{30}$ alkoxy, C$_1$-C$_{30}$ heteroalkoxy C$_1$-C$_{30}$ alkyl sulfide, C$_1$-C$_{30}$ heteroalkyl sulfide, C$_3$-C$_{12}$ cycloalkyl, C$_1$-C$_{12}$ heterocyclyl, C$_2$-C$_8$ alkenyl, C$_2$-C$_8$ heteroalkenyl, C$_2$-C$_8$ alkynyl, C$_2$-C$_8$ heteroalkynyl, C$_6$-C$_{12}$ aryl, C$_1$-C$_{12}$ heteroaryl, alkylaryl, alkylheteroaryl, alkylcyclyl, alkylheterocyclyl, Ph$_2$P(O)—, Ph$_2$P—, (CH$_3$)$_2$P(O)—, (CH$_3$)$_2$P—, Ph$_2$P(S)—, (CH$_3$)$_2$P(S)—, Ph$_3$P=N—, (CH$_3$)$_3$P=N—, FSO$_2$(CH$_2$)$_n$—, ClSO$_2$(CH$_2$)$_n$—, HSO$_3$(CH$_2$)$_n$—, HCO$_2$(CH$_2$)$_n$, FSO$_2$NHSO$_2$(CH$_2$)$_n$—, CF$_3$SO$_2$NHSO$_2$(CH$_2$)$_n$—, C$_n$H$_{2n+1}$ SO$_2$NHSO$_2$(CH$_2$)$_n$—, FSO$_2$(CH$_2$)$_n$—, ClSO$_2$ $(CH_2)_n$—, $C_nF_{2n+1}$ $SO_2NH(CH_2)_n$—, $CH_3O$—$(Si(CH_3)_2O)_n$—, $HO$—$(Si(CH_3)_2O)_n$—, $R$—$(Si(CH_3)_2O)_n$—, wherein n is an integer having a value from 1 to 48; and wherein, optionally, two adjacent substituents R are linked to each other pairwise to form a polycyclic ring system; and b' is the integer defining the stoichiometry necessary to neutralize the positive charge of $O_x$;

in the presence of either i) a solvent system which is a suitable organic solvent, an ionic liquid of formula $A_aB_b$, or a mixture thereof, wherein A is an organic cation comprising at least one omniphobic group, a is an integer from 1 to 8, B is as defined above, and b is the integer defining the stoichiometry necessary to neutralize the positive charge of $A_a$; or alternatively ii) an ionic liquid of formula $A_aB_b$ as a lubricant.

20. The coating composition of claim 19, wherein

O is an organic cation with a formula selected from the group consisting of:

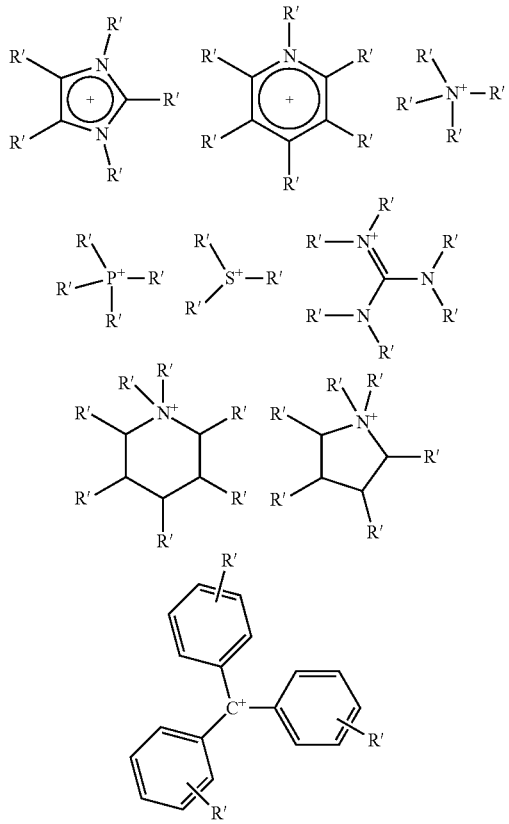

wherein
  i) at least one R' is a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, $Ph_2P(O)$—, $Ph_2P$—, $(CH_3)_2P(O)$—, $(CH_3)_2P$—, $Ph_2P(S)$—, $(CH_3)_2P(S)$—, $Ph_3P=N$—, $(CH_3)_3P=N$—, $FSO_2(CH_2)_n$—, $ClSO_2(CH_2)_n$—, $HSO_3(CH_2)_n$—, $HCO_2(CH_2)_n$, $FSO_2NHSO_2(CH_2)_n$—, $CF_3SO_2NHSO_2(CH_2)_n$—, $C_nH_{2n+1}SO_2NHSO_2(CH_2)_n$—, $FSO_2(CH_2)_n$—, $ClSO_2(CH_2)_n$—, $C_nF_{2n+1}$ $SO_2NH(CH_2)_n$—, $CH_3O$—$(Si(CH_3)_2O)_n$—, $HO$—$(Si(CH_3)_2O)_n$—, $R$—$(Si(CH_3)_2O)_n$—, wherein n is an integer having a value from 1 to 48; and wherein, optionally, two adjacent substituents R are linked to each other pairwise to form a polycyclic ring system, ii) at least one R' is a polymerizable group, and iii) the remaining R are the same or different and are selected from the group consisting of $C_1$-$C_{30}$ alkyl, $C_1$-$C_{30}$ alkoxy, $C_1$-$C_{30}$ alkyl sulfide, $C_3$-$C_{12}$ cycloalkyl, $C_1$-$C_{12}$ heterocyclyl, $C_2$-$C_8$ alkenyl, $C_2$-$C_8$ alkynyl, $C_6$-$C_{12}$ aryl, $C_1$-$C_{12}$ heteroaryl, alkylaryl, alkylheteroaryl, alkylcyclyl, alkylheterocyclyl, $Ph_2P(O)$—, $Ph_2P$—, $Me_2P(O)$—, $Me_2P$—, $Ph_2P(S)$—, $Me_2P(S)$—, $Ph_3P=N$—, $Me_3P=N$—, $FSO_2CF_2$—, $ClSO_2(CF_2)_n$—, $HSO_3(CF_2)_n$—, $HCO_2(CF_2)_n$, $FSO_2NHSO_2(CF_2)_n$—, $CF_3SO_2NHSO_2(CF_2)_n$—, $C_nF_{2n+1}$ $SO_2NHSO_2(CF_2)_n$—, $FSO_2(CF_2)_n$—, $ClSO_2(CF_2)_n$—, $C_nF_{2n+1}$ $SO_2NH(CF_2)_n$—, —OH, —F, —Cl, —Br, —I, —CN, —$NO_2$, —$SO_3H$ and $C_1$-$C_6$ hydroxy alkyl, wherein n is an integer from 1 to 48; and wherein, optionally, two adjacent substituents R are linked to each other pairwise to form a polycyclic ring system; and A is an organic cation with a formula selected from the group consisting of:

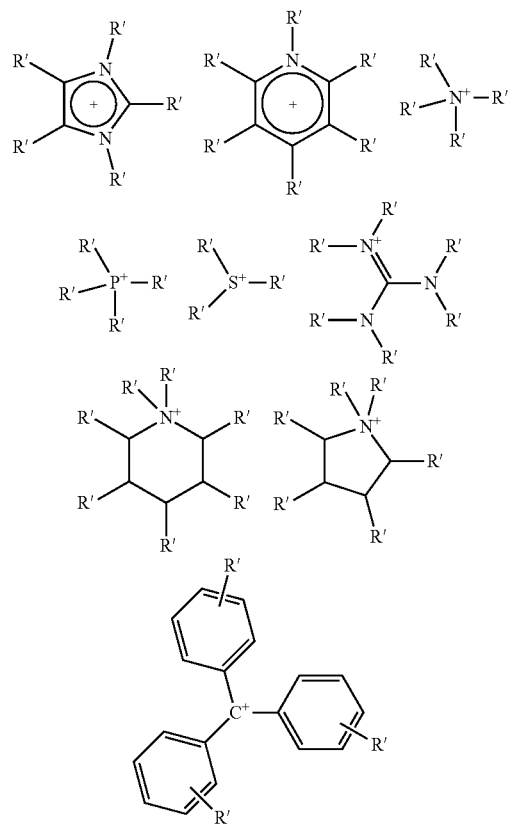

wherein
  i) at least one R' is a completely fluorinated, partially fluorinated or non-fluorinated radical selected from the group consisting of linear or branched $C_1$-$C_{30}$ alkyl, $C_1$-$C_{30}$ heteroalkyl, $C_1$-$C_{30}$ alkoxy, $C_1$-$C_{30}$ heteroalkoxy $C_1$-$C_{30}$ alkyl sulfide, $C_1$-$C_{30}$ heteroalkyl sulfide, $C_3$-$C_{12}$ cycloalkyl, $C_1$-$C_{12}$ heterocyclyl, $C_2$-$C_8$ alkenyl, $C_2$-$C_8$ heteroalkenyl, $C_2$-$C_8$ alkynyl, $C_2$-$C_8$ heteroalkynyl, $C_6$-$C_{12}$ aryl, $C_1$-$C_{12}$ heteroaryl, alkylaryl, alkylheteroaryl, alkylcyclyl, alkylheterocyclyl, $Ph_2P(O)$—, $Ph_2P$—, $(CH_3)_2P(O)$—, $(CH_3)_2P$—, $Ph_2P(S)$—, $(CH_3)_2P(S)$—, $Ph_3P=N$—, $(CH_3)_3P=N$—, $FSO_2(CH_2)_n$—, $ClSO_2(CH_2)_n$—, $HSO_3(CH_2)_n$—, $HCO_2(CH_2)_n$, $FSO_2NHSO_2(CH_2)_n$—, $CF_3SO_2NHSO_2(CH_2)_n$—, $C_nH_{2n+1}SO_2NHSO_2(CH_2)_n$—, $FSO_2(CH_2)_n$—, $ClSO_2(CH_2)_n$—, $C_nF_{2n+1}SO_2NH(CH_2)_n$—, $CH_3O$—$(Si(CH_3)_2O)_n$—, $HO$—$(Si(CH_3)_2O)_n$—, $R$—$(Si(CH_3)_2O)_n$—, wherein n is an integer having a value from 1 to 48; and wherein, optionally, two adjacent substituents R are linked to each other pairwise to form a polycyclic ring system, and ii) the remaining R' are the same or different and are selected from the group consisting of —H, —OH, —F, —Cl, —Br, —I, —CN, —$NO_2$, —$SO_3H$, $C_1$-$C_6$ hydroxy alkyl;

wherein the polymerizable group is either independently selected from the group consisting of a vinyl, an acrylic, a methacrylic, and an allyl group, or alternatively, independently selected from the group consisting of —OH, —SH, —$NH_2$, —COOH, —C(=O)X, ester, anhydride, —NCO, —NCS, and epoxy, provided an ether, thioether, amido, ester, urethane, tiourethane, urea, or thioruea type chemical bond is obtained.

* * * * *